US010753540B2

(12) United States Patent
Anderson

(10) Patent No.: US 10,753,540 B2
(45) Date of Patent: Aug. 25, 2020

(54) SYSTEMS AND METHODS FOR CONVERTING CRYOGENIC LIQUID NATURAL GAS TO HIGH PRESSURE NATURAL GAS AND TO LOW PRESSURE NATURAL GAS AND RETAIN ALL CONVERTED PRODUCT AND TO FURTHER DISPENSE ONLY BY VOLUNTARY ACTIONS OF THE USER

(71) Applicant: Kenneth W. Anderson, Boerne, TX (US)

(72) Inventor: Kenneth W. Anderson, Boerne, TX (US)

(*) Notice: Subject to any disclaimer, the term of this patent is extended or adjusted under 35 U.S.C. 154(b) by 237 days.

(21) Appl. No.: 15/834,737

(22) Filed: Dec. 7, 2017

(65) Prior Publication Data

US 2018/0119885 A1 May 3, 2018

Related U.S. Application Data

(63) Continuation-in-part of application No. 14/397,457, filed as application No. PCT/US2013/038291 on Apr. 25, 2013, now abandoned.
(Continued)

(51) Int. Cl.
*F17C 9/02* (2006.01)
*F17C 5/06* (2006.01)

(52) U.S. Cl.
CPC .................. *F17C 9/02* (2013.01); *F17C 5/06* (2013.01); *F17C 2201/0138* (2013.01);
(Continued)

(58) Field of Classification Search
CPC ........ F17C 2221/033; F17C 2225/0123; F17C 2225/041; F17C 2225/0153; F17C 9/02;
(Continued)

(56) References Cited

U.S. PATENT DOCUMENTS 2,665,556 A * 1/1954 Otten ........................ F17C 9/02
165/135
3,712,073 A * 1/1973 Arenson ................... F17C 9/02
62/50.2
(Continued)

*Primary Examiner* — Keith M Raymond
*Assistant Examiner* — Webeshet Mengesha
(74) *Attorney, Agent, or Firm* — Robert M. Schwartz

(57) ABSTRACT

A system to convert and dispense pressurized gas(es) of cryogenic liquids of gas(es), and systems and methods to efficiently convert liquid natural gas (LNG) to compressed natural gas (CNG) and low pressure natural gas (NG) and other cryogenic liquids of gas. The system requires one dedicated pressure vessel of horizontal and vertical elements at the dispensing location to convert, retain, store, and dispense multiple pressures of gas from a cryogenic liquid supply such as a non-dedicated high pressure cryogenic personal supply tank. The system efficiently modifies and controls parameters of volume, pressure, and temperature in conversion scale to retain all converted product under human control to dispense without process required waste for use in commercial, industrial, and in particular single family residential applications and service can be accomplished by pickup truck and trailer, where semi trucks, big rig trucks and process pollution are not welcome.

19 Claims, 26 Drawing Sheets

Related U.S. Application Data

(60) Provisional application No. 61/637,908, filed on Apr. 25, 2012.

(52) U.S. Cl.
CPC  *F17C 2201/0147* (2013.01); *F17C 2201/032* (2013.01); *F17C 2201/035* (2013.01); *F17C 2201/05* (2013.01); *F17C 2201/056* (2013.01); *F17C 2201/058* (2013.01); *F17C 2203/0304* (2013.01); *F17C 2203/0391* (2013.01); *F17C 2203/0614* (2013.01); *F17C 2203/0646* (2013.01); *F17C 2203/0648* (2013.01); *F17C 2205/0149* (2013.01); *F17C 2205/0326* (2013.01); *F17C 2205/0332* (2013.01); *F17C 2205/0335* (2013.01); *F17C 2221/011* (2013.01); *F17C 2221/012* (2013.01); *F17C 2221/014* (2013.01); *F17C 2221/016* (2013.01); *F17C 2221/033* (2013.01); *F17C 2223/013* (2013.01); *F17C 2223/0161* (2013.01); *F17C 2223/033* (2013.01); *F17C 2225/0123* (2013.01); *F17C 2225/036* (2013.01); *F17C 2227/0302* (2013.01); *F17C 2227/0393* (2013.01); *F17C 2250/01* (2013.01); *F17C 2250/036* (2013.01); *F17C 2250/0426* (2013.01); *F17C 2265/05* (2013.01); *F17C 2270/0171* (2013.01); *F17C 2270/0178* (2013.01); *F17C 2270/07* (2013.01)

(58) Field of Classification Search
CPC ........ F17C 2201/0138; F17C 2201/035; F17C 2201/05; F17C 2223/013; F17C 2223/0161; F17C 2223/033; F17C 2250/0426; F17C 2250/001; F17C 2250/036; F17C 2227/0393
See application file for complete search history.

(56) References Cited

U.S. PATENT DOCUMENTS

| | | | | |
|---|---|---|---|---|
| 3,986,340 | A | * 10/1976 | Bivins, Jr. | F17C 9/02 62/50.2 |
| 5,937,655 | A | * 8/1999 | Weiler | F17C 7/04 62/50.1 |
| 9,849,406 | B1 | * 12/2017 | Frolov | B01D 19/0042 |
| 2013/0341182 | A1 | * 12/2013 | Anderson | C25B 9/00 204/278 |
| 2015/0037174 | A1 | * 2/2015 | Cajiga | F17C 5/06 417/53 |
| 2015/0345707 | A1 | * 12/2015 | Landeck | F17C 1/00 165/53 |
| 2016/0161058 | A1 | * 6/2016 | Moddemann | F17C 1/16 220/560.12 |
| 2017/0097121 | A1 | * 4/2017 | Johnson | F17C 13/025 |
| 2019/0353397 | A1 | * 11/2019 | Franklin | F02M 21/06 |

* cited by examiner

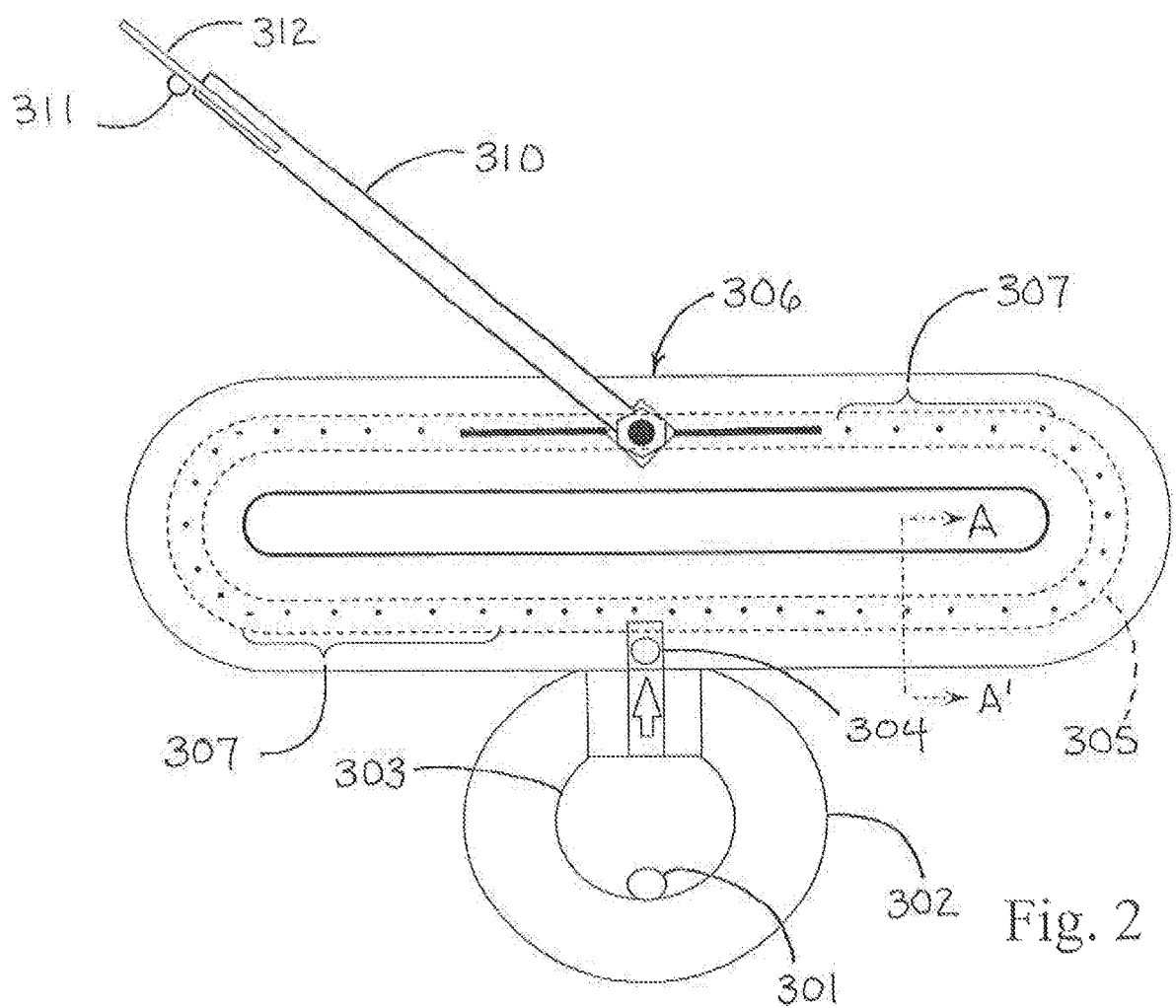
Fig. 2
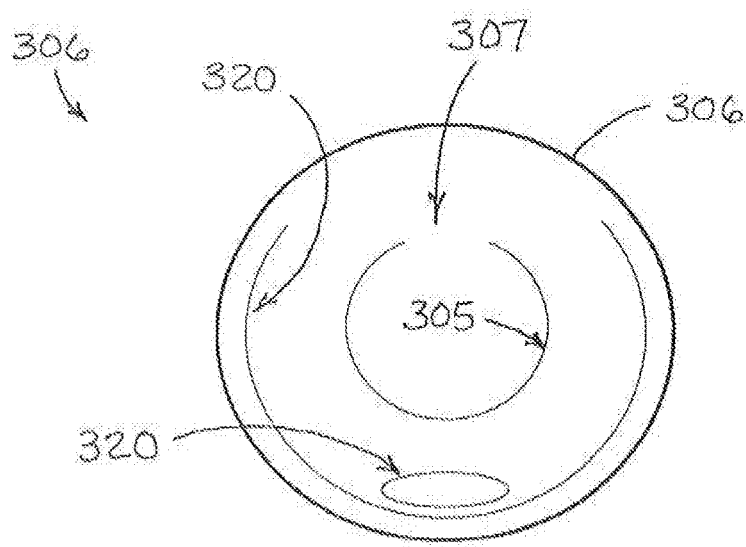
Fig. 3 (A-A')

SYSTEMS AND METHODS FOR CONVERTING CRYOGENIC LIQUID NATURAL GAS TO HIGH PRESSURE NATURAL GAS AND TO LOW PRESSURE NATURAL GAS AND RETAIN ALL CONVERTED PRODUCT AND TO FURTHER DISPENSE ONLY BY VOLUNTARY ACTIONS OF THE USER

CROSS REFERENCE TO RELATED APPLICATIONS

This application is a continuation-in-part of U.S. patent application Ser. No. 14/397,457, filed Oct. 27, 2014, entitled "Systems and Methods for Converting Liquid Natural Gas to Compressed Natural Gas and to Low Pressure Natural Gas" which claims benefit of PCT/US13/38291, filed on Apr. 25, 2013, entitled "Systems and Methods for Converting Liquid Natural Gas to Compressed Natural Gas and to Low Pressure Natural Gas" which claims benefit of U.S. Provisional Application 61/637,908 filed Apr. 25, 2012.

BACKGROUND OF THE INVENTION

The present invention relates generally to systems for efficiently converting batches of the cryogenic liquid of a gas into a beneficial pressurized gas such as liquid natural gas (LNG) to compressed natural gas (CNG), also known as pressurized natural gas (PNG), and further to low pressure natural gas (NG). The present invention relates more specifically to a system for efficiently modifying and controlling the parameters of volume, pressure, and temperature in converting liquid natural gas (LNG) to compressed natural gas (CNG) and eventually to low pressure natural gas (NG) for the purpose of storing and dispensing of each of the same for use in residential applications. The invention further relates the need to scale to a single user's residential natural gas needs, and to further dispense only by voluntary actions of the user and not forced by process use or required "deinventory" pollution venting or low value forced dispensing. This issue relates as well as in a variety of commercial and industrial applications needing clean small scale dispensing of CNG to promote natural gas for vehicle fueling infrastructure. The present invention also converts the cryogenic liquids of other gases into a beneficial pressurized gas such as Argon, Nitrogen, Oxygen and other gasses. The present invention serves the unserved and underserved markets including those markets without infrastructure pipelines, interrupted supplies, and those with emerging small scale needs which can be scaled as markets grow.

DESCRIPTION OF THE RELATED ART

No efforts have been made in the past to convert LNG to CNG and retain all converted product, dispense multiple pressures, and to further dispense only by voluntary actions of the user using a single container dedicated to the point of dispensing. A few efforts have been made in the past to efficiently store and convert liquid natural gas (LNG) to compressed natural gas (CNG) pressure and then to dispense it as low pressure natural gas (NG). Most of these efforts suffer from significant losses and dependence on distributed heat energy during the processes of compressing and/or de-compressing the systems from required process dispensing or venting "deinventory" pollution or use extra pressure building devices to move LNG from one container to another and require more than 6 containers. Quine U.S. Pat. No. 6,474,101, requires 8 containers: 6 CNG Tanks, 1 LNG Storage Tank and 1 LNG/CNG Converter for example, and his 1,000 gallon gasifier LNG/CNG Conversion unit with 4,999 psi of methane must be decompressed by forced dispensing or venting down to 50 psi before his 3,000 gallon LNG Storage Tank is able to move LNG to his gasifier, and his 3,000 gallons of LNG if not processed will vent out of his LNG Storage Tank into the open air. Quine's full scale service station further requires bulk highway semi truck deliveries of LNG His LNG Storage Tank container and piping and pipe pressure relief specifications do not allow movement of high pressure gas into his LNG Storage Tank, so for Quine's art small scale dispensing or the retention of all gasification from LNG to CNG or moving CNG from LNG-CNG Converter to LNG Storage Tank is impossible. There is no art other than the present best invention which preserves for a human to decide whether to dispense or not. Quine's actual process loss and risk of loss requiring storage of LNG and multiple batch process cause pollution that the present best invention does not, within the quantities of natural gas, at various temperatures, pressures, and volumes which can be maintained and transferred. Although the use of natural gas in industry, commercial manufacturing, and residential applications has and is continuing to increase, the ability to store, transport, and convert the low volume high quantity forms of natural gas has lagged behind the demand for natural gas in a variety of applications, particularly home fueling, and commercial dispensing of small volumes of CNG that scale as the volume of CNG vehicles demand grows. Currently all CNG fueling at a residence requires a natural gas distribution pipeline. This eliminates about 25% of U.S. population whose homes do not have natural gas delivered by pipeline. For those fortunate to have a natural gas pipeline distribution, small scale CNG fueling requires a compressor connected to the natural gas pipeline supply to the house and filling a NGV (Natural Gas Vehicle) overnight. Reliability of these compressors is problematic because of the amount of time that it takes to fill and variations in quality of pipeline natural gas. Full scale compressor service stations are available for about $500,000-$750,000 and are more reliable, but require many customers to be profitable and require commercial and industrial locations and large natural gas pipelines or semi truck traffic to serve them. Such storage, transportation, and conversion problems have become especially acute in the smaller residential applications associated with the use of natural gas and the use of semi trucks in residential neighborhoods and/or rural roads. There is no LNG-CNG-NG conversion system for a single residential home's needs. There is no LNG-CNG conversion system of 2 containers, of which 1 is dedicated for converting, retaining and dispensing high pressure for vehicles and typical and low pressure gas NG utilities scaled for the single residence save this present best invention. Absent a natural gas pipeline, there is no delivery available of natural gas in the safe CH4(methane/NG) chemistry which does not pool on the ground or on water in the event of a leak. CH4 (methane/NG) is lighter than air; however, other forms of NG can pollute the ground or water. The ability to efficiently store, transport, and convert natural gas (typically in the form of CNG or LNG) has inhibited the ongoing growth of the natural gas industry for use in residential and micro commercial applications. The micro commercial conversion and dispensing of other gasses such as Argon or Nitrogen for such as for filling pneumatic automobile tires at a self serve gas station is an additional market and use for the present best invention.

SUMMARY OF THE INVENTION

The present best invention provides one assembled equipment package transportable by a pickup truck and trailer, being a dedicated container at the place of dispensing with horizontal and vertical elements for the liquid cryogenic gas conversion, to retain and separate liquid from gas, cold and warm, and density by orientation being an ambient temperature pressurized gas conversion system with instrumentation including communication and using cryogenic liquid such as a LNG to CNG conversion system with an optional NG supply and backup system, and an optional method for adding other elements of gas to enhance the NG and CNG altering flame characteristics while requiring no source pipeline or required delivery by a semi truck. The invention takes in LNG and by controlled warming converts it to vapor CNG having the additional room to expand into but still contained within a small enough volume to result in an ideal fueling vapor pressure of CNG such as 3,000-3,600 and up to 5,000 psi.

Container sizes for valuable pressures. The present invention container size ratios of 1:21:2.4 between the personal LNG supply and the dedicated second container result in valuable pressures. The present best invention is the best invention to convert other cryogenic liquids into pressurized gas to dispense. The process container ratios for best performance must be adjusted based on the expansion ratio of the cryogenic liquid of the gas as compared to the pressurized gas and the amount of gas already in the system.

Piping for Gravity movement of liquids and gas. Piping between containers must be two way to permit gas to balance pressure allowing the container with cryogenic liquid, which is at a superior elevation, to flow into the inferior elevation container. Piping must not contain pressure relief valves of a pressure which is less than the balancing pressure of the first undedicated container and the second dedicated container or pollution or waste will occur.

Container Sizes for Argon and Nitrogen Cryogenic Liquids and Specification Limitations. As a result for this present best invention, the personal supply Container 1 as described for LNG would be smaller for Nitrogen by approximately 14% and for Argon 30% smaller. The expansion rate of Cryogenic CH4 LNG is 600:1, Argon (Ar) is 847:1, and Nitrogen (N) is 696:1. The expansion rate assumes one atmosphere of pressure and is not exact because of the presence of impurities, variations, and variations of isotope chemistry. The desired pressure for dispensing as well as the typical amount of residual gas left over from previous conversions in the dedicated container where dispensing occurs, the value of the product gas, the temperature of conversion of a gas into its phase change cryogen, and the containment costs are relevant for obtaining strategic pressures of certain cryogenic gasses using this best invention. Nitrogen is known to be marketed at 200-300 bar. Argon is known to be marketed at 135-275 bar. A custom container of the present best invention intending to dispense Argon for a low pressure market may have a benefit to reducing the size of the dedicated 2nd container by 30% and still serve the market for dispensing Argon. Generally the size of the dedicated container could be increased or decreased by a ratio based on whether the anticipated goal dispensing was to occur above or below 3,500 psi, the goal dispensing pressure of LNG of the present best invention. Some specifications of containers do not allow high pressure, such as LNG Storage tanks where the design is such to preserve a cryogen for a month at a time by increasing insulation and decreasing thermal transfer by reducing the thickness of the container, which limits strength for containing pressure. Gas law requires a pressure balance between two containers before liquid can gravity flow between them.

Cryogenic Liquid Gasification/Conversion. Gasification, using gas from previous conversions and containment as a heat sink. Gas from previous gasifications which is within the dedicated container further serves to aid in conversion of cryogenic liquid to gas by balancing temperatures between the density and temperature of the cryogenic liquid verses the density and temperature of the ambient gas when the result is fully contained. Gasification is also enhanced by thick walled high pressure gasifying containers which serve a dual purpose: a heat sink in the form of the shell which can be greater than one inch in thickness and is a thermal mass storage and a conduit of heat to thermal transfer and complete gasification and warming cryogenic gas toward ambient temperature. The warming conversion can occur as the result of thermal transfer using ambient temperature and lapse of time. The oval shape of the converter of one of the exemplary embodiments encourages movement of air and further enhances uniform thermal transfer. The horizontal and vertical elements of one of the exemplary embodiments provide for gravity movement of Cryogenic liquid gas such as LNG from the first cryogenic container into the second container, the gasifier container where it is converted to pressurized warm gas where it can be dispensed, without requiring a pressure building device.

Warming can also occur by using one of many types of heat sinks or other known methods. Natural gas within the system may be used for combustion to warm the thermal heat sink. Outside heat sources such as exhaust stacks or direct solar may also be used. The shape of the expansion chamber allows the thermal evolution of the heating of the LNG using horizontal and vertical elements which result in separation by temperature and density in the second container phase change converter, pressurized gas storage, and a dispensing container for multiple pressures of gas. The scale of the second container as compared to the first container and the amount of LNG delivered determine the range of the high pressure result; and retained gas from previous conversion can be used to warm the added cryogenic gas with the product of previous cycles and the ambient heat sink in the form of the containment shell while calculating the approximately 600:1 ratio of expansion of LNG as a liquid to its gas phase. Optionally, if desired, the gas movement may be mechanically, electrically, or otherwise enhanced resulting in quicker and/or more consistent system-wide warming. The stack shape of the best preferred embodiment is less expensive to construct and provides greater separation of the warm converted lower density gas production from the cold. Optional separation of gas/liquid being warmed by forced movement encourages separation enhancing gasification when desired and economically beneficial.

The function of the internal conduit in the present system is to isolate, in a practical cost efficient manner, the cryogenic liquid such as LNG but not the CNG from the outside pipe and allow the LNG to vaporize without touching the outside of the pipe, lessening metal stress that could occur from a localized cold spot on an otherwise non-stressed temperature vessel exterior, which could result in system life shortening metal fatigue or premature failure. To this end, in one earlier embodiment, a drip containment system and method was shown as a partial pipe in the cross section to promote against such events from occurring. In the present best invention beneficial separation of liquid from gas especially occurs in the vertical stack of the second container during conversion gasification. Optionally, making warming gas follow and climb a circuitous path or a vertical rise and fall physically promotes the physical separation of liquid from warming gas and dry gas for dispensing at the high vertical end.

The system of the present invention will be used in a primary way to fuel natural gas (primarily methane) transportation vehicles such as cars, trucks, carts, lifts, cycles, etc. The present invention's CNG component can also be used as a feed stock for hydrogen production. The fuel made ready for use by the system of the present invention is superior to fuel supplied by non-LNG "natural gas" or mixed LNG sources and natural gas together, because it will be chemically more homogeneous. Water is removed. Liquid distillates, such as butane, ethane, and propane, which can settle out of methane vapor (CH4) in excess proportions, are removed in the production of LNG when they freeze or separate during the refrigeration process making a cryogenic liquid from a gas; and as a result, these impurities are prevalent in the system's fuel production in known proportions. As opposed to other fueling equipment, the fuel supplied by the system of the present invention is superior because it begins with LNG which is more homogeneous than natural gas from an older pipeline and will not begin as residential NG chemically altered with operant sulfur or other chemicals. This avoids gas streams which contain water which can foul equipment using the gas streams. The methane fuel, when used, can easily be additionally enhanced by the addition of hydrogen or other elemental gas such as Argon or Nitrogen or molecules to alter flame characteristics for custom requirements when they are desired, using the present best invention gas or liquid ports to enter the dedicated container located at the dispensing location.

The system of the present invention will be used also to convert cryogenic Argon to pressurized gas for use, including as an additive for CH4. The system of the present invention will be used also to convert cryogenic Nitrogen to pressurized gas for use. Cryogenic Nitrogen to gas will be used, including in coin operated dispensing to fill pneumatic tires located typically where retail gasoline is sold. It will also be used to convert cryogenic Oxygen to gas for use in the medical environmental as well as a flame control for a wide variety of uses including smelting and casting. Each cryogenic gas has a different ratio of expansion from liquid to gas which will determine the best container size ratios to result in a beneficial pressure result for ambient temperature "warm" gas.

The system of the present invention will be used as a transportation compressed natural gas (CNG) or pressurized natural gas (PNG) fueling station. The system of the present invention will further be used as a natural gas supply (NG) such as for a residence. The system of the present invention will be used as a reserve backup natural gas supply such as for a residence for purposes including emergency, as well as being an emergency energy backup supply for food or medical facility energy requirements. It will also be used as the source of energy for generating other forms of energy such as powering a gas turbine generator to make electricity or to power a hybrid natural gas over electric motor or to charge an electric car. The system of the present invention will be used as the source gas or a supplemental natural gas supply point for a natural gas distribution system. The system of the present invention will be used as a point of sale of natural gas and other converted gasses from cryogenic liquids. The system of the present invention will be used for peak supply storage of natural gas. Isolated property owners with access but without electrical utilities or heat utilities will use this present invention where no natural gas pipelines exist or where they cease to function and this best invention becomes the sole source supply of energy for an area.

This invention is scalable to allow dimensional changes which result in different beneficially targeted volumes and pressures by adjusting the ratio between the size of the first container cryogenic liquid receiver to the second container liquid to gas gasifier, taking into account the expansion ratio of the cryogenic liquid, and the target contained pressure range of the resulting gas product for increased usefulness. Adding additional dedicated second containers at a single location is anticipated, because it allows cascade dispensing, and because it allows one half of the equipment to be converting from a cryogen to a pressurized gas while the other half is dispensing. The result will always be that the first container will be smaller than the second container, and for methane, if the target pressure sought is about 3,500 psi since the expansion of methane is approximately 600:1, the size ratio between the second larger container and the first smaller container calculates to between 2-2.4:1. The invention's most beneficial scaling is in providing smaller scale use which benefits from not using semi trucks especially where their use is impractical, illegal, or unwelcome. The invention does up scale from a commercial micro dispensing size by the addition of a multiple of the same class of the on site dedicated containers. Two or three dedicated gasifier converter dispensers can be joined to accomplish cascade dispensing. Low cost CNG storage can also be easily incorporated in the process of scaling this invention but for improved security it is elevated by creating a floor supported by the upper vertical element of the dedicated container.

BRIEF DESCRIPTION OF THE DRAWINGS

FIG. 2 is a partially schematic, partial cross-sectional, top plan view showing elements of the system of the present invention shown in FIG. 1.

FIG. 3 is a detailed cross-sectional view of the system showing elements of the present invention taken along cross-section lines A-A' in FIG. 2 of the location of the internal smaller container for holding CNG and an optional cryogenic drip containment method.

FIG. 5I is a schematic block diagram of a variety of applications of the present best invention and distribution system of the LNG to CNG to NG system and methods of the present invention.

FIG. 6G (A) is partially schematic block diagrams showing an elevational view of the preferred embodiment which includes the two base containers in one location.

SUMMARY OF REFERENCED ELEMENTS

TABLE 1
301 LNG fill portal for cryogenic like vessel.
302 Outer container for LNG
303 Inner container for LNG Receiver approximate ratio being 1:2.4 (41.6% of the size) by volume of expansion chamber shown scaled at 40 gallons made of a high nickel content steel or sandwiched carbon fiber and plastic coatings or combinations thereof
304 Neck pipe, one way with valve, connects LNG container to CNG expansion chamber inner pipe valve; must be dual specification of LNG temperature and CNG pressure strength.
305 Inner oval pipe volume approximate ratio being 1:1 by volume to inner container made of a high nickel content steel or aluminum alloy.
306 Oval pressure vessel expansion chamber scaled at 96 gallons being the LNG/CNG gasifier and CNG Storage and CNG and NG Dispensing Container, preferably duplex stainless steel.
307 Transfer holes to vent vaporizing LNG transforming to CNG into expansion chamber in a uniform manner.
308 Safe vent before failure connected to expansion chamber.
309 Leak detect and alarm, ultrasonic preferred.
310 Swing arm dispensing tube.
311 CNG specific fill start/stop/auto stop.
312 CNG specific fill attachment.
313 Vent and stand pipe connected to expansion chamber.
314 Heat sink to air in heat transfer for the benefit of vaporizing LNG May be a water bath, may be as cooling fins, or refrigeration coil.
315 Vertical and lateral support.
316 Heat exchange for heat sink such as available from exhaust stack or direct heat.
317 Optional hydrogen input to enhance CNG quality as available from electrolysis at depth or other.
318 Optional supply NG from inner container.
319 Control and instrument panel LNG to CNG system.
320 Internal LNG drip pipe.
321 Pressure reducing valve for (318) and (322).
322 Optional supply NG from expansion chamber.
323 Chemical additives to natural gas to be used for residential fuels, often use a sulfur compound (enhancing leak detection).

DETAILED DESCRIPTION OF THE PREFERRED EMBODIMENTS

Figure 1:
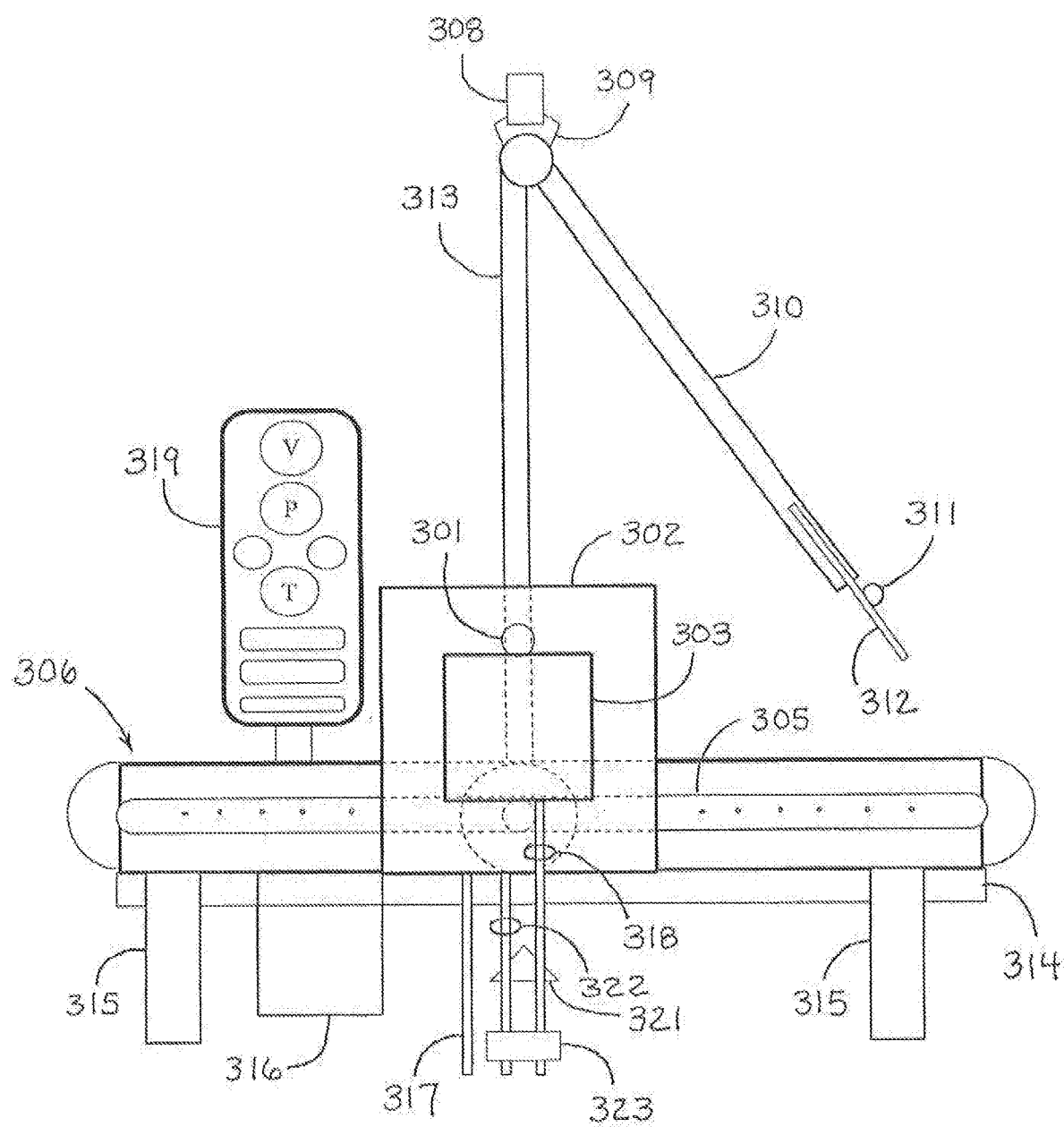
FIG. 1 is a partially schematic, partial cross-sectional, elevational view of the system showing elements of the present invention for converting LNG to CNG
Figure 4A:
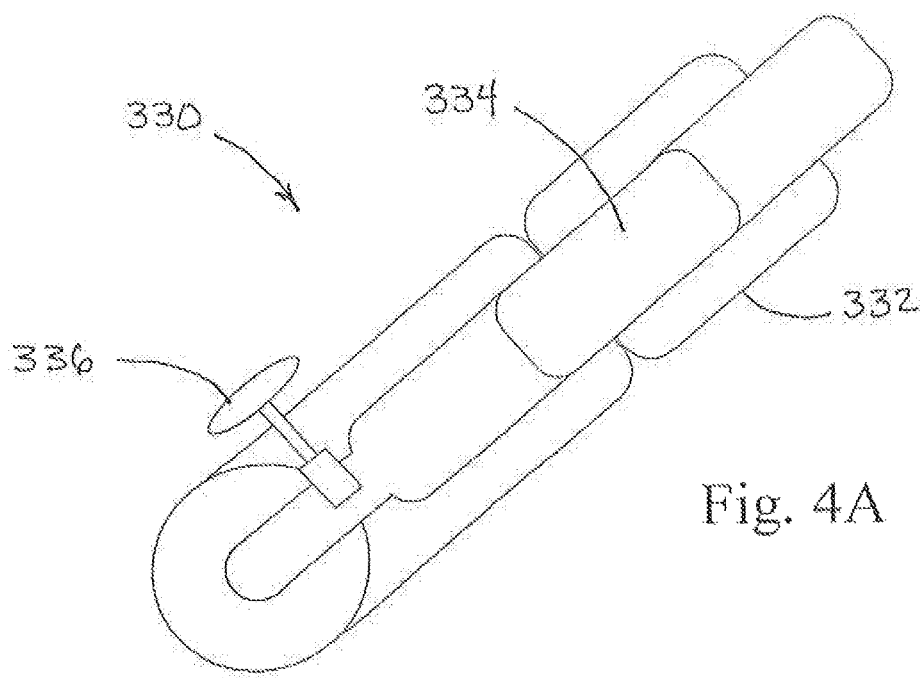
FIGS. 4A-4D are detailed views showing elements of an LNG personal supply tank device of the present invention which are the origin of the transportable high pressure mobile non dedicated first container, being a "traveling" cryogenic LNG receiving container of the present best invention which may serve to fuel multiple second containers in a single day and deliverable by a pickup truck.
Figure 4B:
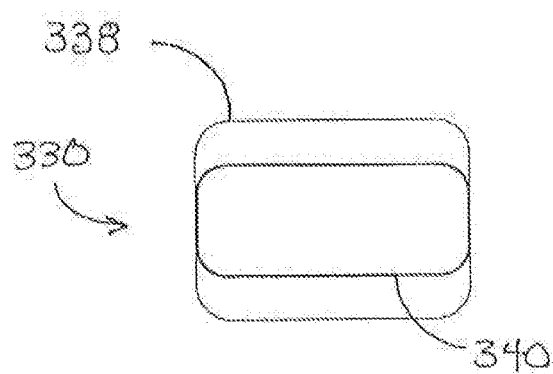
Figure 4C:
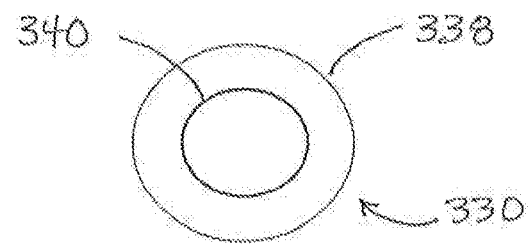
Figure 4D:
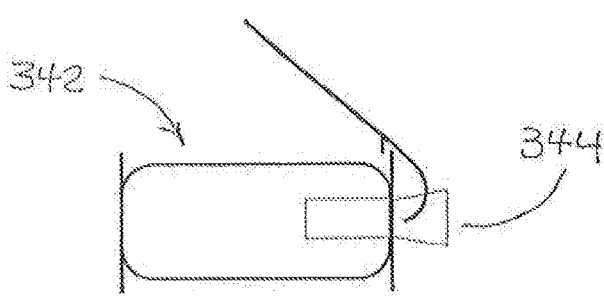

The present invention provides a LNG to CNG to NG system and method. This system may be optionally enhanced by a system generating hydrogen gas such as an electrolysis at pressure and/or at depth system. The system may also be optionally enhanced by a steam and methane reformation system, including as a heat exchange mechanism described. In the system of FIGS. 1 & 2, an oval CNG expansion chamber 2.4 times the size of the LNG cryogenic container is provided with center tube circles vented. High nickel alloy steel and some layered composites and aluminum alloys are preferably used in the construction of this system where there is contact with cryogenic liquids. The system further may include passive and/or active heat sinks. The system includes LNG fill portal 301 for the cryogenic like vessel. Also disclosed are outer container 302 and inner container 303 for the LNG Again, the approximate ratio of the container volume being 1:2.4 (41.6%) to the volume of oval pressure vessel expansion chamber 306.

Neck pipe 304 provides a one way flow with valve that connects the LNG container to the CNG expansion chamber inner pipe. Inner oval pipe 305 has a volume in the approximate ratio of 1:1 with inner container 303. Oval pressure vessel expansion chamber 306 is preferably made of duplex stainless steel. Transfer holes 307 are provided to vent vaporizing LNG into oval pressure vessel expansion chamber 306 in a uniform manner. A safe vent valve 308 is provided before oval pressure vessel expansion chamber 306. A leak detection and alarm device 309 is also provided with an ultrasonic type device preferred.

Swing arm dispensing tube 310 extends to provide one manner of dispensing the CNG A CNG specific fill valve 311 provides start, stop, and auto stop for the flow. A CNG specific fill attachment 312 is also provided. Vent and stand pipe 313 is connected to oval pressure vessel expansion chamber 306. Heat sink 314 to air is provided for heat transfer for the vaporization of the LNG Vertical and lateral supports 315 are shown for the structural support of the system. Heat exchange 316 is shown such as is available from the exhaust stack in the steam and NG reformation system described above. Hydrogen input 317 is further provided to enhance CNG quality and is available from an electrolysis at depth system mentioned above, or an electrolysis at pressure system. Optional natural gas (NG) supply 318 is provided to enhance CNG quality as is also available from a steam and NG reformation system as mentioned above. Low pressure natural gas (NG) can be dispensed from 318 from the LNG receiver or/and 322 from the expansion chamber gasifier 306 both through 312 pressure reducer. Control and instrument panel 319 is provided to monitor CNG volume, pressure, and temperature in the system, as well as to show time, elapsed time, and to indicate a percentage to add hydrogen.

Reference is made to FIG. 3 which is a cross section view taken along section line A-A' in FIG. 2, which shows primary elements of the present invention. Oval pressure vessel expansion chamber 306 is shown surrounding inner oval pipe 305. Below and within expansion chamber 306 is internal LNG drip pipe 320. Collectively, FIGS. 1-3 demonstrate the method of the present invention by reference to the details of the system designed to carry out the method at ambient parameters.

FIGS. 4A-4D provide detailed views of an LNG personal supply tank component of the system, which shows elements of the present invention. This origin of the mobile non dedicated first container is a "traveling" LNG personal supply tank receiving container of the present best invention. Portable LNG tanks without wheels (less than 15 gallons liquid or weighing about 50 pounds) and portable LNG tanks with wheels (carrying about 50 gallons) has become an integral part of delivery, fueling the phase change and adjusting system of the present LNG to CNG to NG system. This personal LNG tank 330 would be a high pressure container 334 (or 340 or 342) surrounded by insulation 332 (or 338). Appropriate valves 336 and fill/dispense attachments 344 would be utilized to fill the LNG converting gasifier which also retains all, stores all, and dispenses all CNG and NG converted from the LNG from the non dedicated container. Such an element may be a stand alone liquid container for other LNG devices as well and which may serve to fuel multiple second containers in a single day, not dedicated to any specific second container, and which could be deliverable by pickup truck.

The feasible elements do exist for this new component of the system. These may be characterized as liquid individual natural gas (LiNG) devices and pressurized liquid individual natural gas (PLiNG) devices. This accessory would be a cryogenic container with an LNG specific input port and output port. It would be constructed with at least one container within a container and further nesting of containers possible. It would preferably be structured with layers of insulation, vacuum layers, and layers of reinforcement. The container would preferably be engineered at a 2:1 length to width ratio and comprised of nickel at 7%-9% or where there is contact with liquid. The container may hold a cold thermal mass to deter gasification. It can be emptied by gravity flow after equalization of pressure with the recipient container or without tipping using a hand pump. The system of the present invention would use such a container as a "stage" to ramp down temperatures "refrigeration" of the equipment in order to mitigate issues of thermal shock to the system and beneficially increase the density of internal gas for fueling. The container could also be used as a method of topping off the system of the present invention.

Figure 5A:
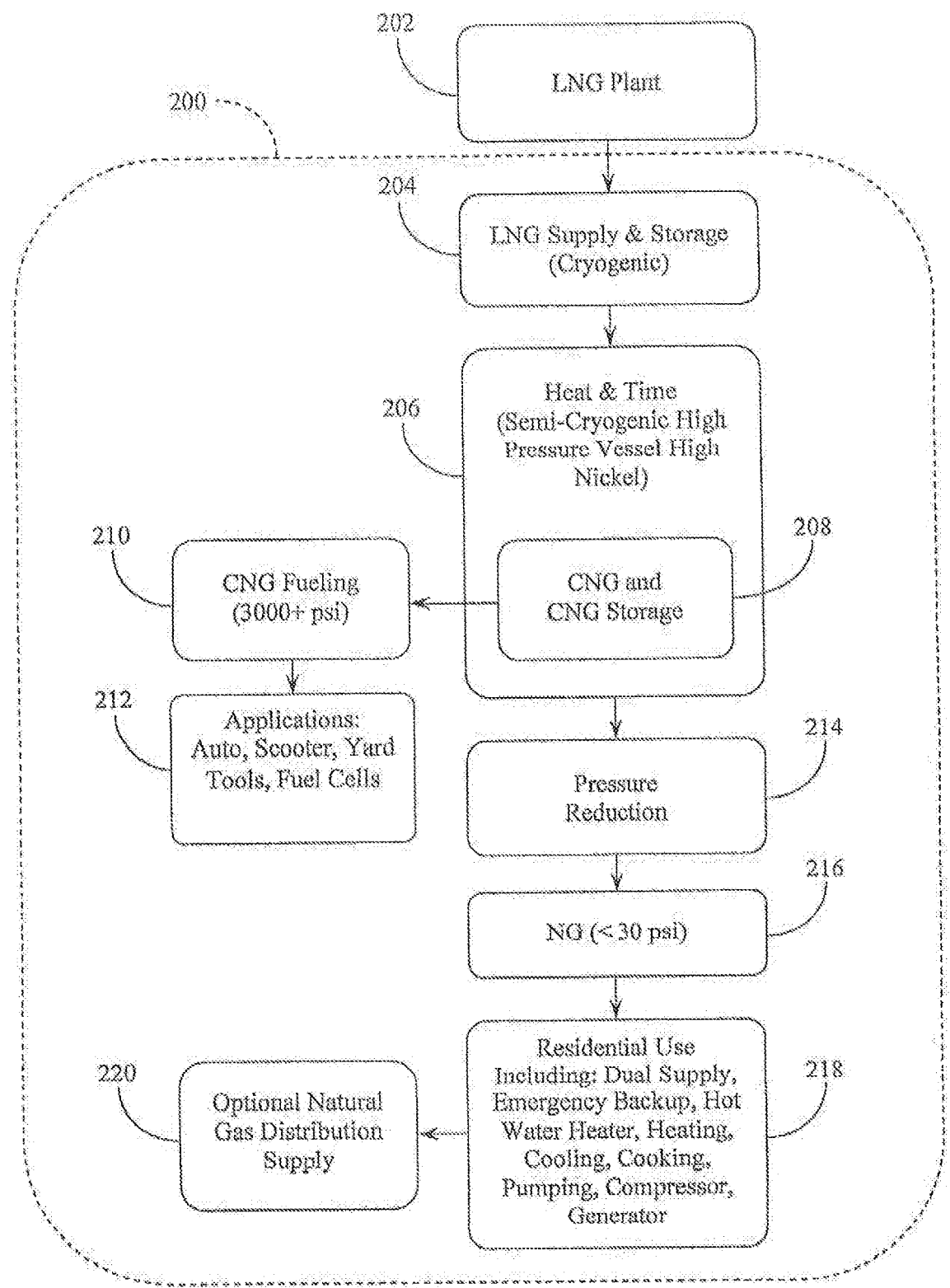
FIGS. 5A-5H are schematic block diagrams showing a variety of applications of use of accessories of the LNG to CNG to NG system and methods of showing elements of the present invention and the invention's natural progression of use.

Reference is next made to FIGS. 5A-5H which are schematic block diagrams showing a variety of applications of the LNG to CNG to NG system and methods of some of the uses for the present invention, and FIG. 5I shows the applications of the LNG to CNG to NG system and methods of the best present invention. In these diagrams residential area 200 is shown to implement the systems of the present invention receiving an LNG supply from LNG plant 202. Internal to the area is LNG supply and cryogenic storage 204. Through heat and time in the system of the present invention 206, and from CNG storage 208, the CNG may be utilized in CNG fueling 210 to applications 212. Through pressure reduction 214 the system produces NG (<30 psi) 216 for residential use 218 and optional natural gas distribution 220.

Figure 5B:
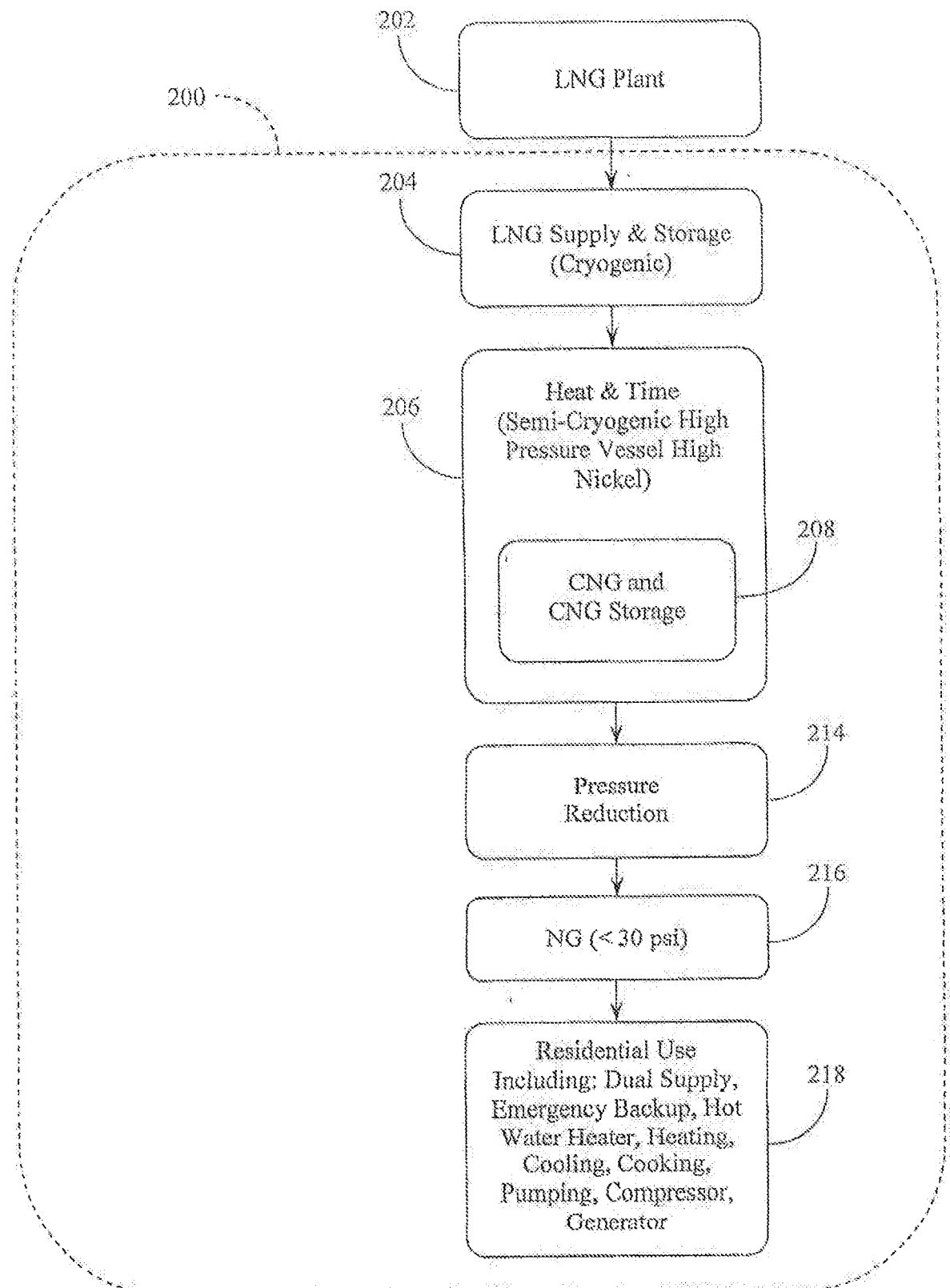
Figure 5C:
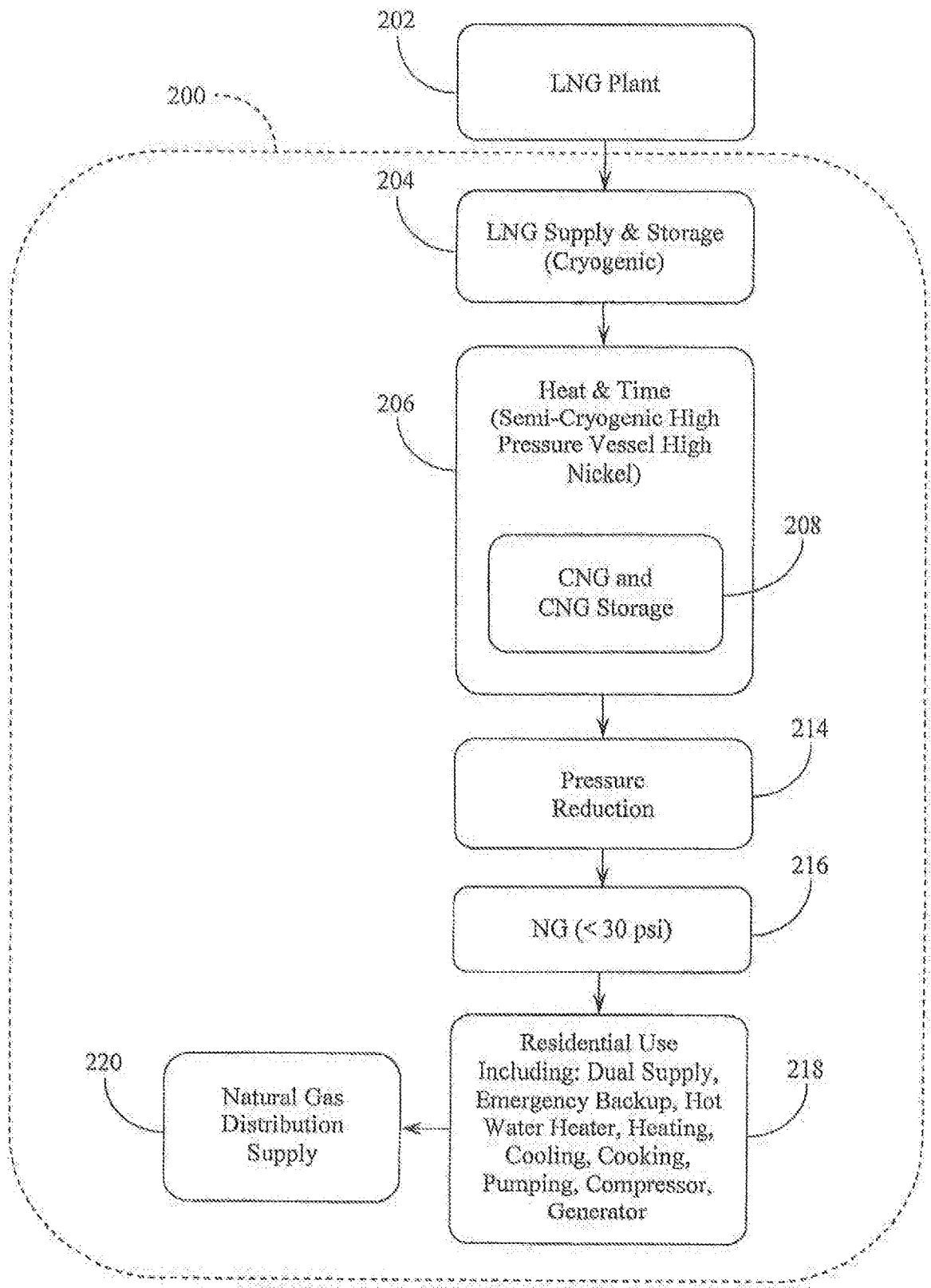
Figure 5D:
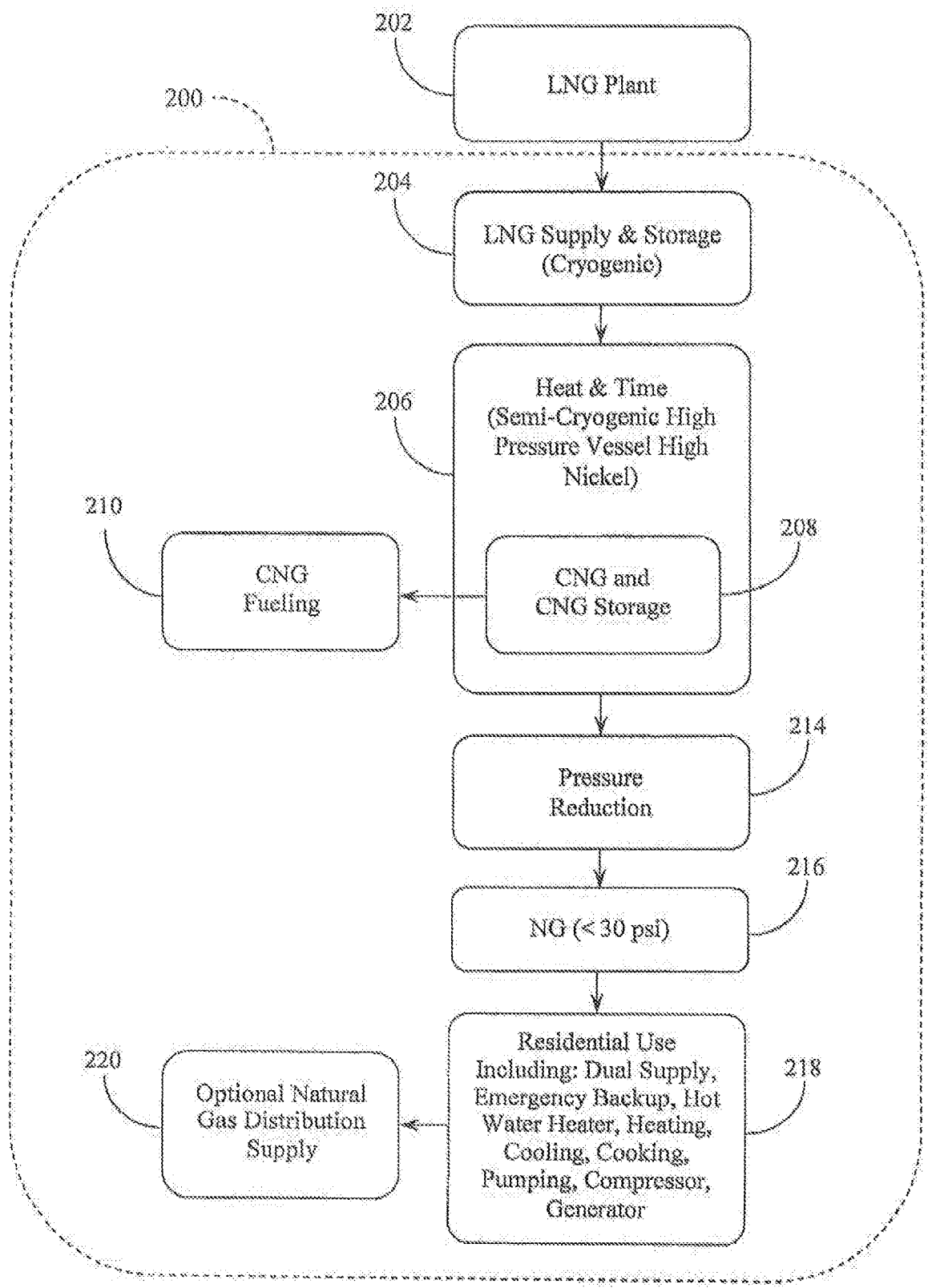
Figure 5E:
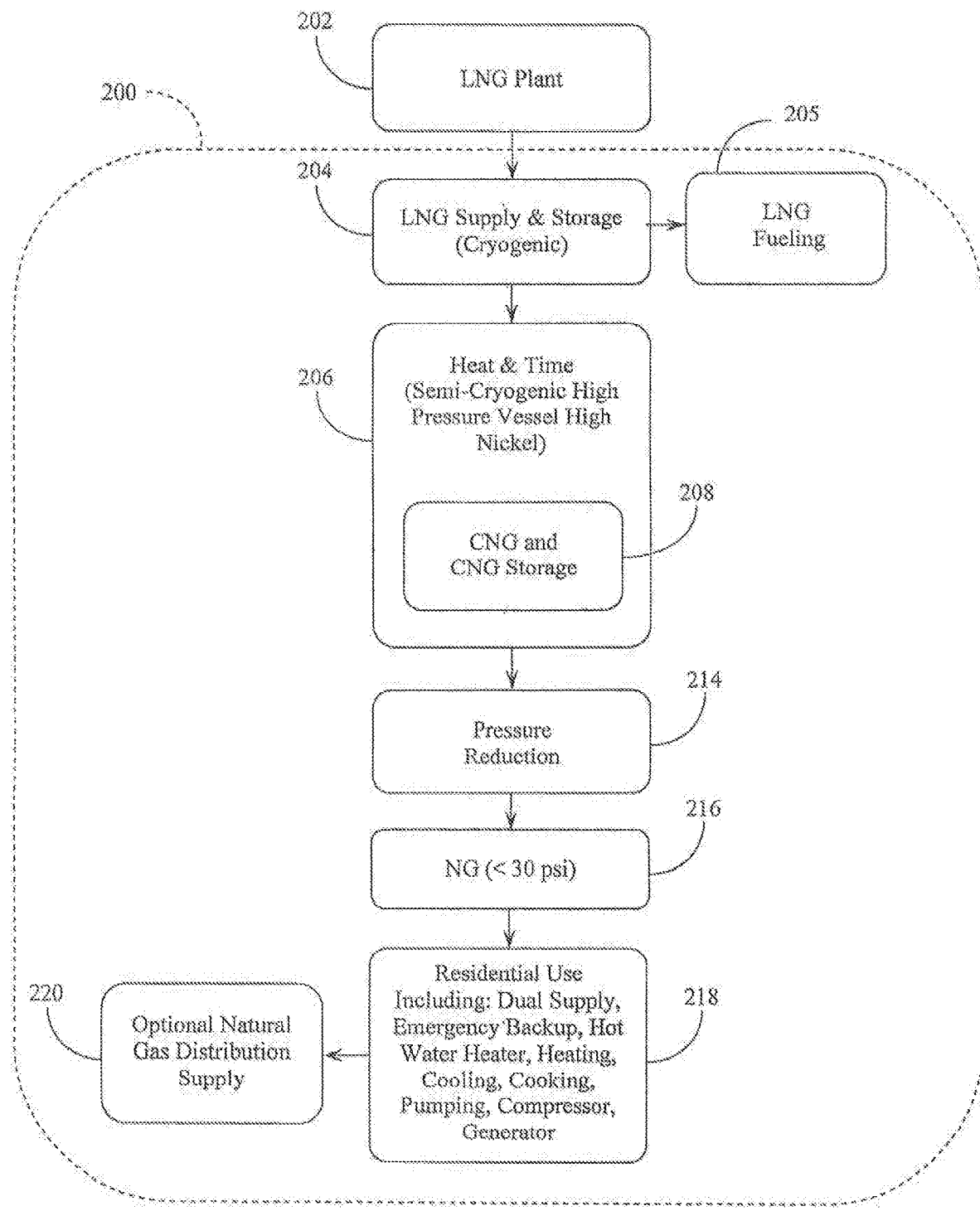
Figure 5F:
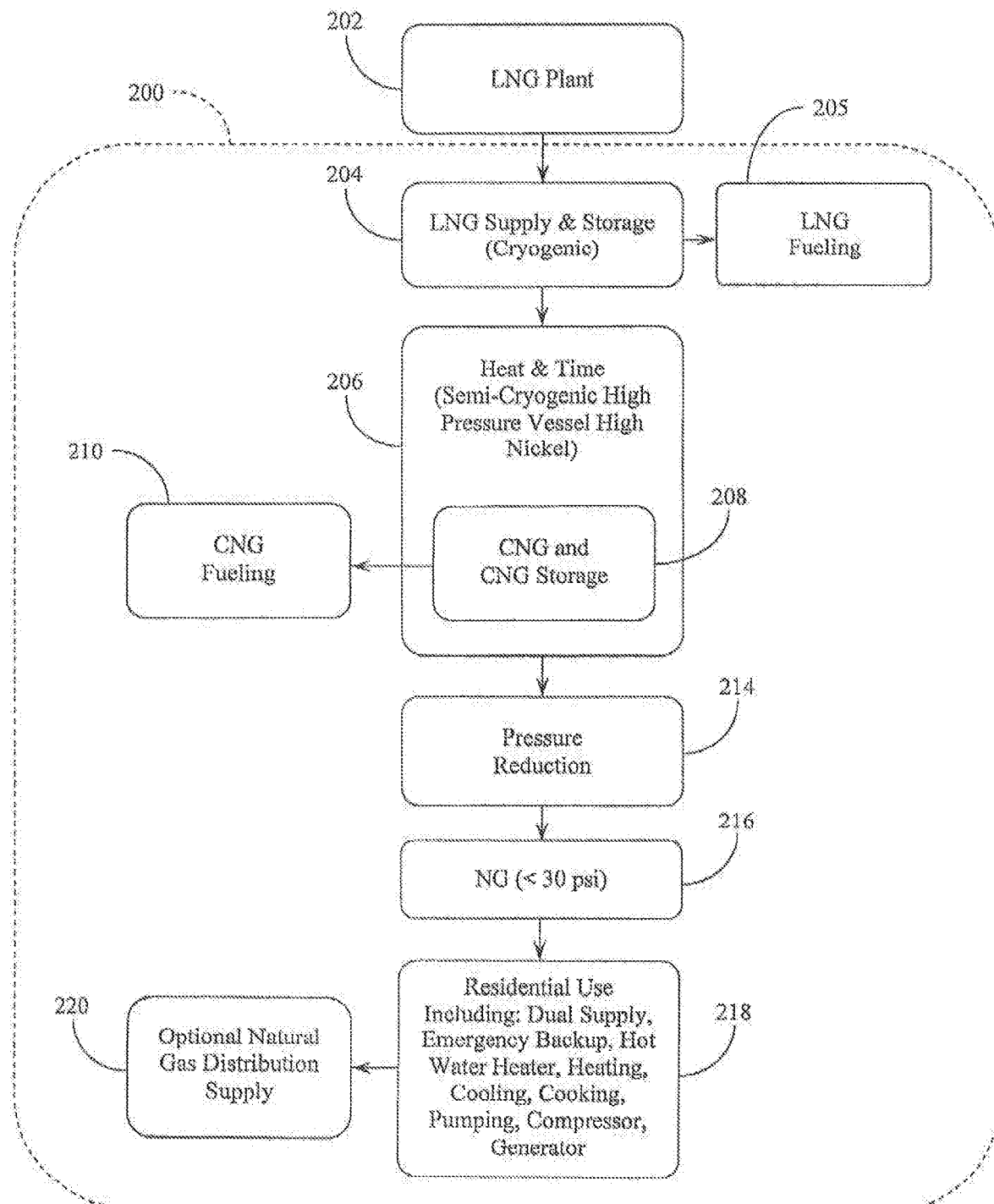
Figure 5G:
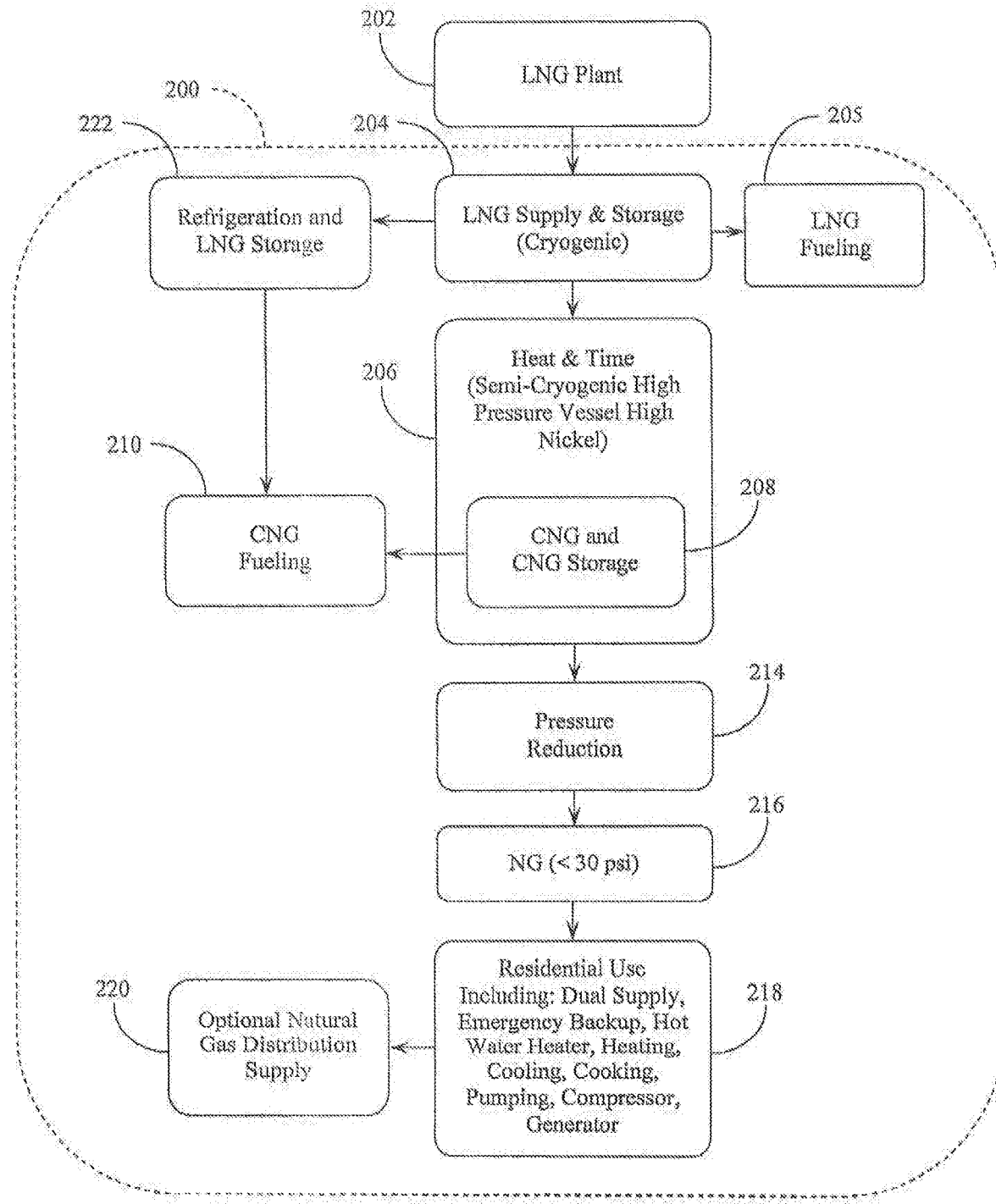
Figure 5H:
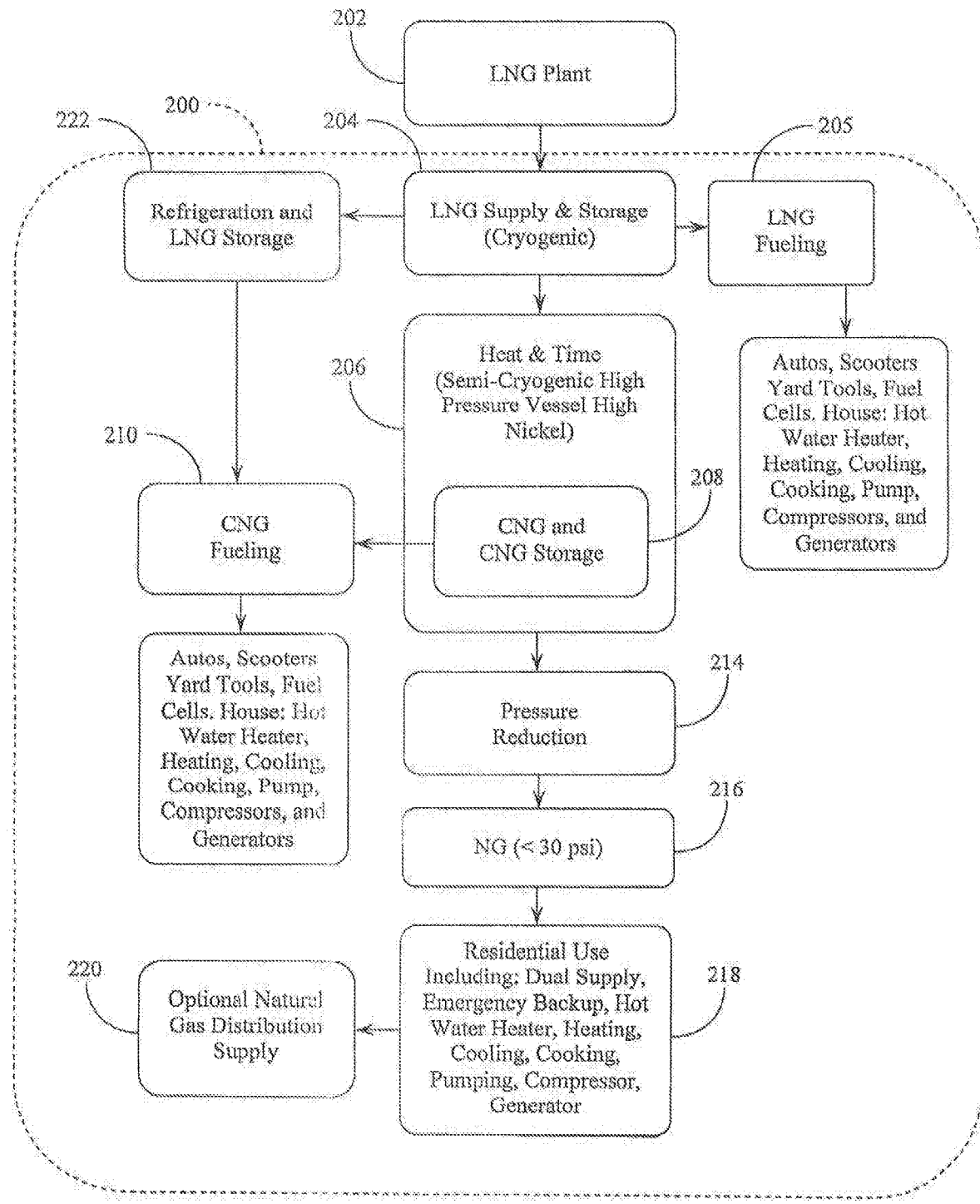
Figure 51:
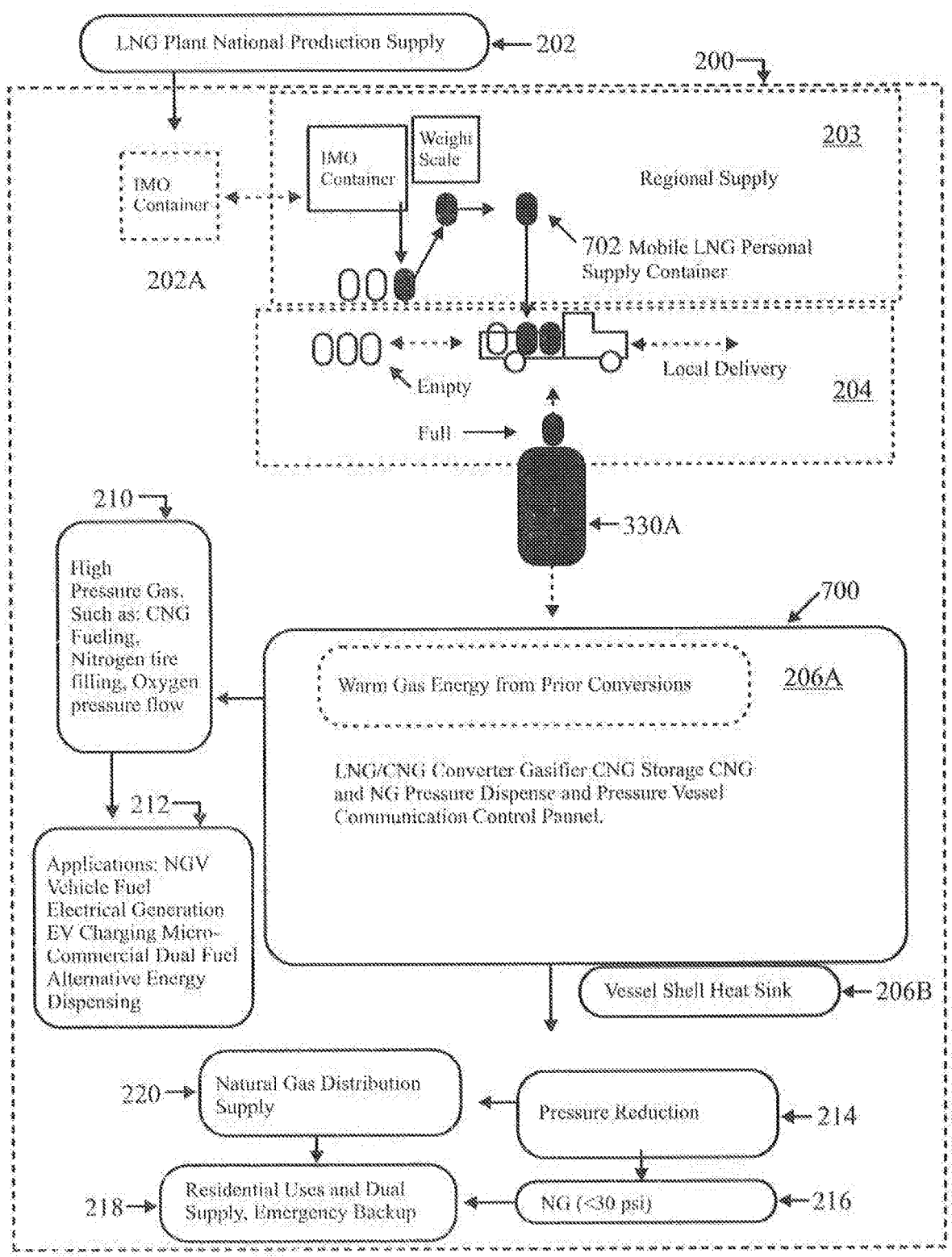

FIG. 5A shows a preferred embodiment system and method. FIG. 5B a preferred residential use embodiment. FIG. 5C the addition of access to the NG distribution system. FIG. 5D the addition of the CNG fueling option. FIG. 5E the addition of the LNG fueling option 205. FIG. 5F the addition of both the CNG and LNG fueling options. FIG. 5G adds the use of a refrigeration and LNG storage component 222. FIG. 5H adds devices which may be filled at the LNG Fueling station 205.

FIG. 5I is a schematic block diagram. Element 200 shows the assembly of the distribution system of the LNG to CNG to NG and a variety of application uses of preferred cryogen LNG as the best embodiment system and method of the best present invention. LNG is the refrigerated liquid state of methane gas and is an export fuel produced nationally and shown at 202 as an LNG national production supply. An IMO Container 202A is a shipping container which can be used to carry LNG, and be off loaded to establish a Regional Supply point. The present best invention fuels the two penetration Mobile LNG Personal Supply Container Assembly 330A, shown in detail at FIG. 8A. At the Regional Distribution Supply location 203 the volume of the fill of Container Assembly 330A can be accurately determined by weight scale using a known tare weight of the container. 330A is used for local delivery 204 as the mobile cryogenic personal supply containers which do not require semi trucks for delivery. 700 is the assembly of the container dedicated to the point of dispensing and shown in detail at FIG. 8B. The two container assemblies can be temporarily connected and cryogenic LNG can be moved from 330A to 700. The cryogen of Container Assembly 330A enters into Assembly 700 and is converted to pressurized gas using warm gas energy from prior conversion 206A and using the vessel shell as a heat sink 206B (may weigh about 2 tons) with time and ambient temperature input to complete gasification. At 210 high pressure fueling of the devices of 212 occurs, including a natural gas vehicle at a residence or at a commercial location, in addition the simultaneous micro dispensing of multiple alternative energies of CH4 methane and electric vehicle (EV) recharging using the methane as the energy source for electrical generation will occur. At 216 low pressure NG is produced by pressure reduction of high pressure gas at 214. Any and all of the production supply may be set aside and saved 218, reserved for a future emergency or put to current use; or if natural gas, could become a part of a natural gas distribution system 220, with each dispense being defined by the human dispenser operator.

Reference is next made to FIGS. 6A-6G which show an alternate preferred embodiment of the structure of a system implementing a method of the invention. FIGS. 6A-6G are partially schematic block diagrams showing an elevational view of an alternate preferred embodiment of the present invention for converting LNG to CNG and identify the progression of steps implemented to carry out the process of the invention. This series of drawing figures discloses in partially schematic form (relative sizes represented) the basic structure of the system of the present invention and the progress of the method implemented with the system for converting LNG to usable CNG Reference is next made to FIG. 6G (A) which includes two base containers dedicated to one location and showing additional expanded accessory elements, which can be expanded accessory containers and valve sequences, and pressure results of the accessory containers when carrying out the process of one embodiment of the invention.

Figure 6A:
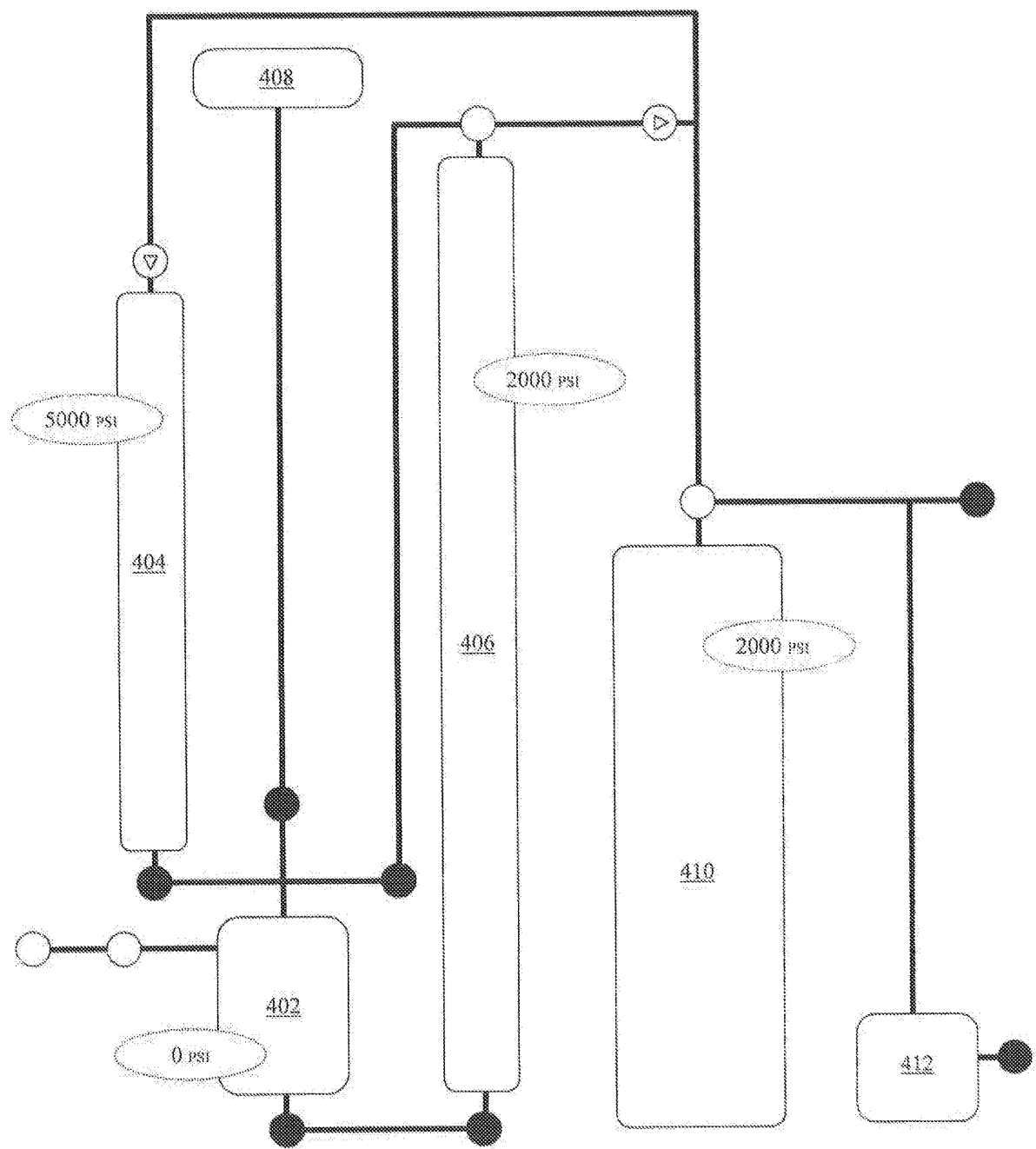
FIGS. 6A-6G are partially schematic block diagrams showing an elevational view of an alternate preferred embodiment showing elements of the present invention for converting LNG to CNG and identifying the progression of steps and valve sequences, and pressure results of the accessory containers when implemented to carry out the process of the invention.

FIG. 6A discloses the prior essential components in the system and identifies operation of the system through a first step of loading LNG In general, the system 400 comprises LNG container 402, CNG maximum pressure container 404, LNG-CNG phase change container 406, NG powered heater 408, CNG storage container 410, and pressure reducer 412.

Figure 6B:
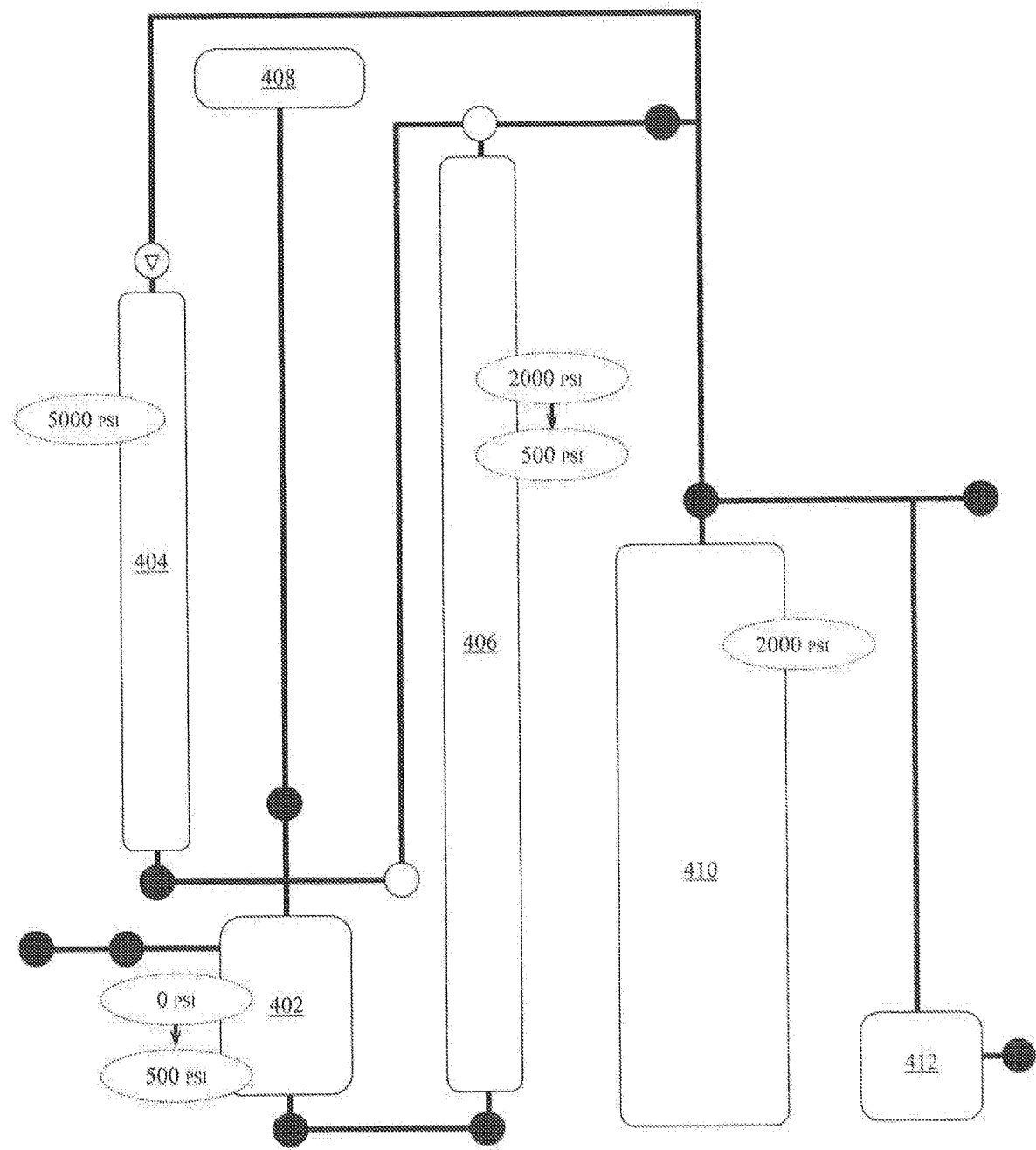

In the first step of the prior process where LNG is loaded into the system, valves leading into LGN container 402 are opened to receive the LNG In FIG. 6A open valves are represented as open circles, and closed valves represented as darkened circles, while one way valves and check valves are represented with triangles in circles. The CNG maximum pressure container 404 is at 5,000 psi while the LNG-CNG phase change container 406 is at 2,000 psi. Likewise, CNG storage container 410 may preferably be at 2,000 psi. FIG. 6B represents a balancing of pressure step in the operation of the system. Inlet valves are closed and valves between LNG container 402 and LNG-CNG phase change container 406 are opened. Thus beginning at 0 psi in LNG container 402 and ending at 500 psi LNG-CNG phase change container 406 begins at 2,000 psi and ends at 500 psi.

Figure 6C:
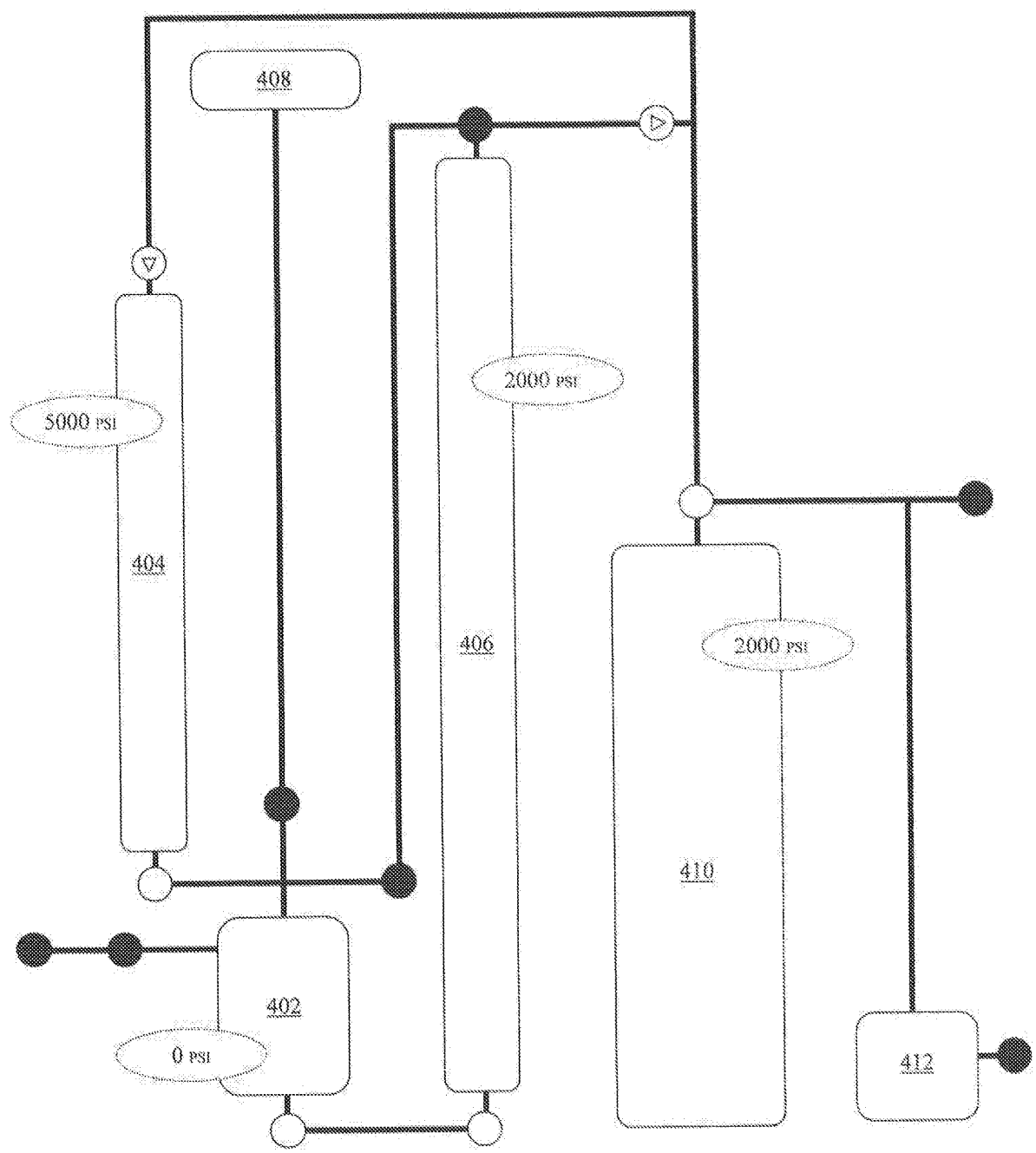

In FIG. 6C the prior process step of charging phase change container 406 with LNG is carried out. In this view, the LNG is contained in a center Dewars like container within LNG-CNG phase change container 406. A valve is opened between LNG container 402 and CNG maximum pressure container 404. CNG maximum pressure container 404 begins at 5,000 psi and ends at less than whatever pressure is required to move the LNG into the phase change container 406. CNG storage container 410 remains at 2,000 psi.

Figure 6D:
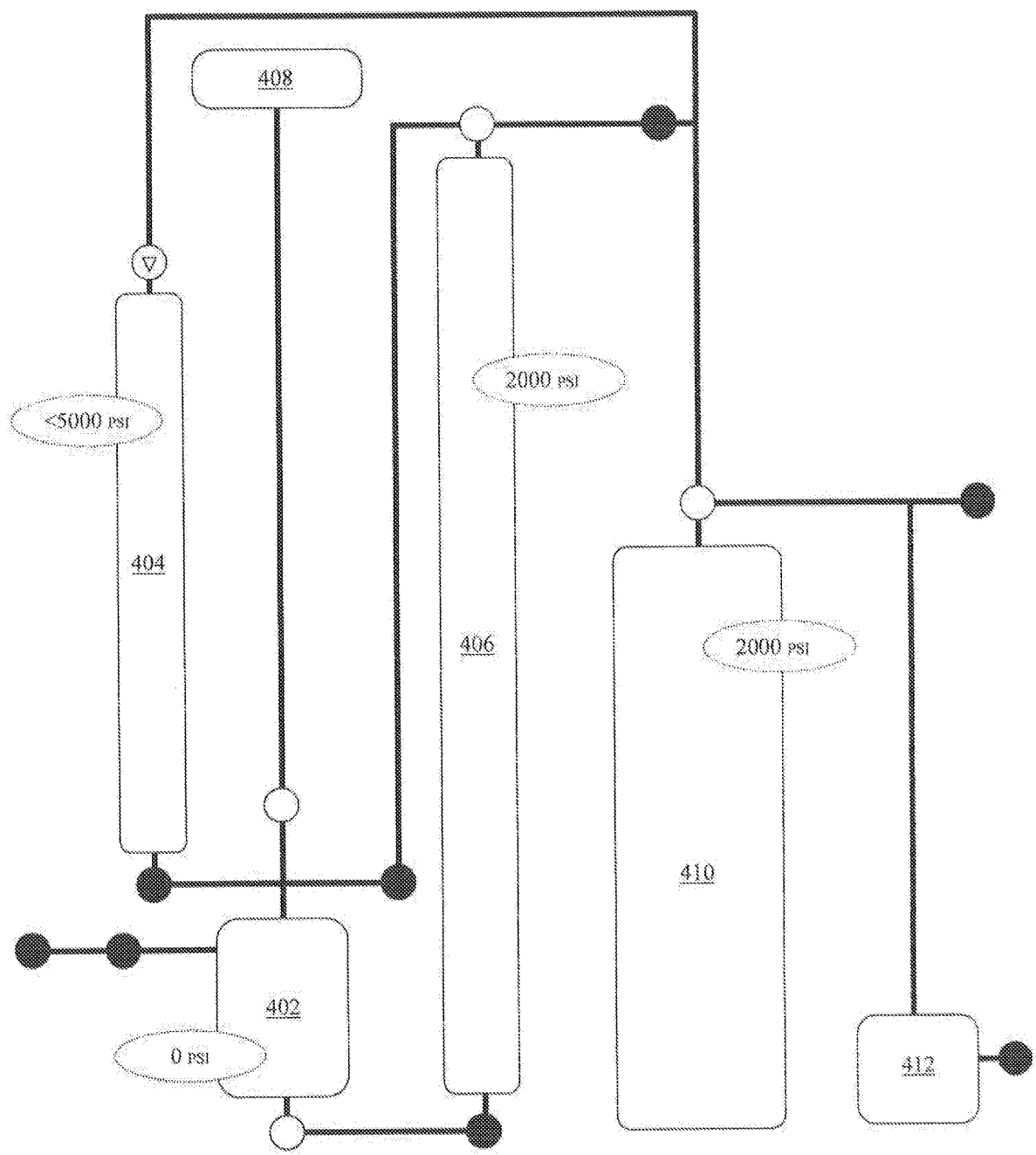

FIG. 6D demonstrates the prior process step of applying heat to the phase change container 406 to facilitate the overall process. In this view, NG powered heater 408 is auto ignited at gas detection and heats a coil positioned along the length of phase change container 406. CNG maximum pressure container 404 is now below 5,000 psi, once again representing only the pressure required to move the LNG into the phase change container 406. LNG container 402 varies in pressure until all of the NG is consumed in the process resulting in a 0 psi in LNG container 402. CNG storage container 410 again operates at 2,000 psi.

Figure 6E:
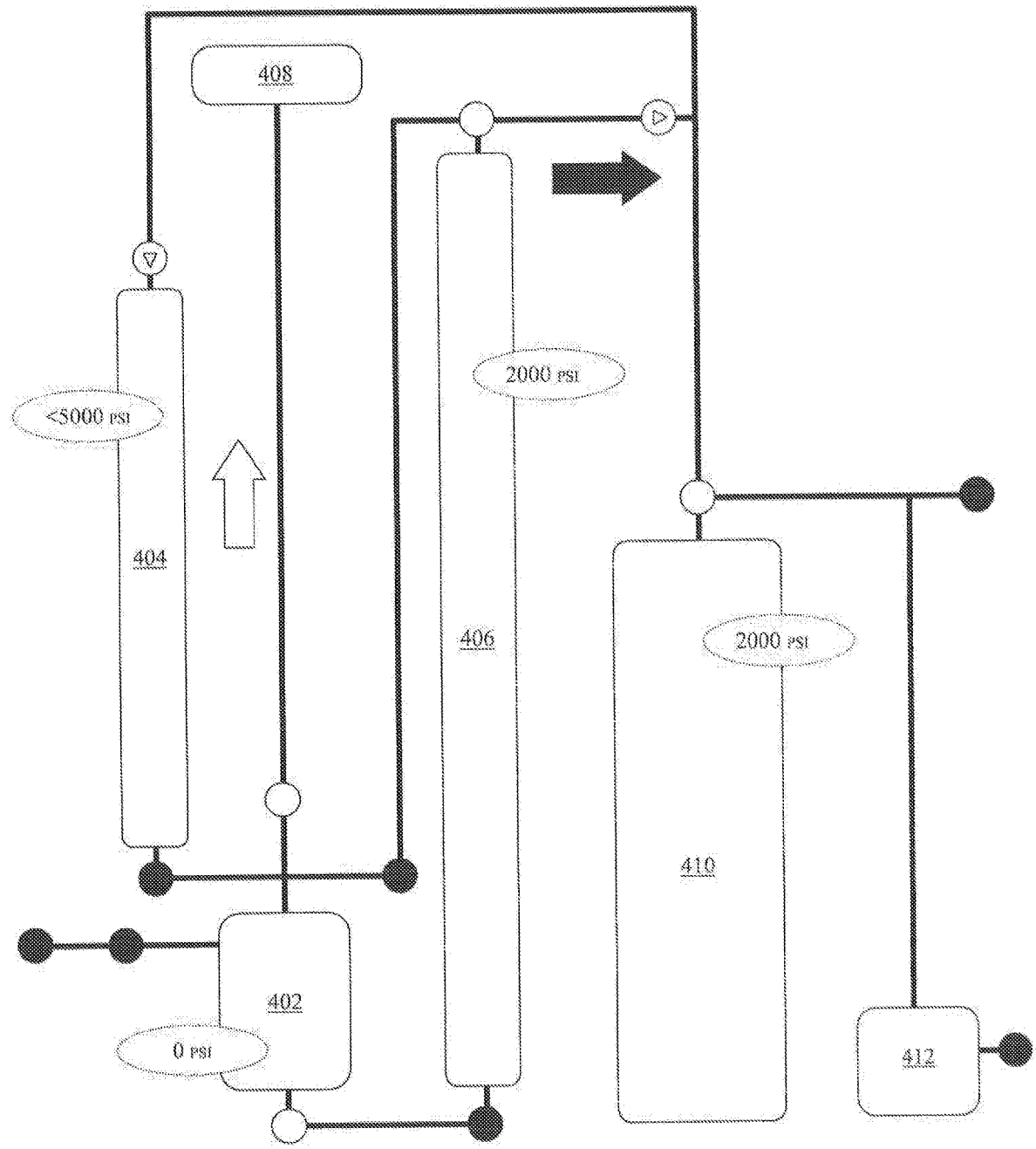

FIG. 6E represents the prior process step of joining the LNG-CNG phase change container 406 and the CNG storage container 410. Each of these two containers are then optimally positioned at 2,000 psi. The valves indicated between the CNG containers are activated when the pressures are equal.

Figure 6F:
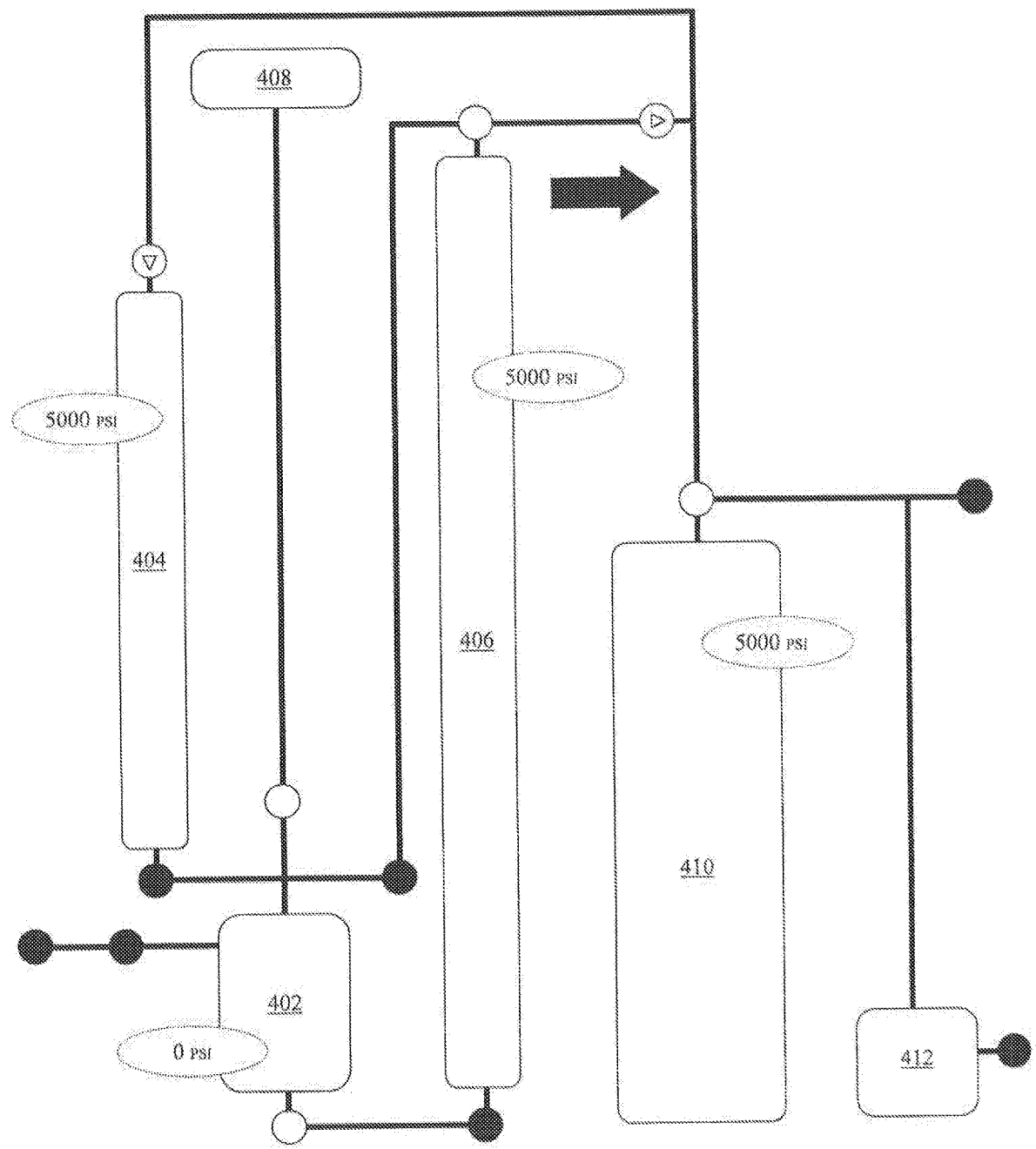

Reference is next made to FIG. 6F which shows the prior process step of gasification being completed. Once again, NG powered heater 408 is operable to facilitate the movement of LNG into the phase change container 406 and thereby into the CNG storage container 410. Given the volumes and pressures associated with the previous steps in the system, the balance pressure between LNG-CNG phase change container 406 and CNG storage container 410 should end up at approximately 5,000 psi. This is also the pressure in CNG maximum pressure container 404. The process, facilitated by NG powered heater 408, utilizes all of the LNG deposited into LNG container 402.

Figure 6G:
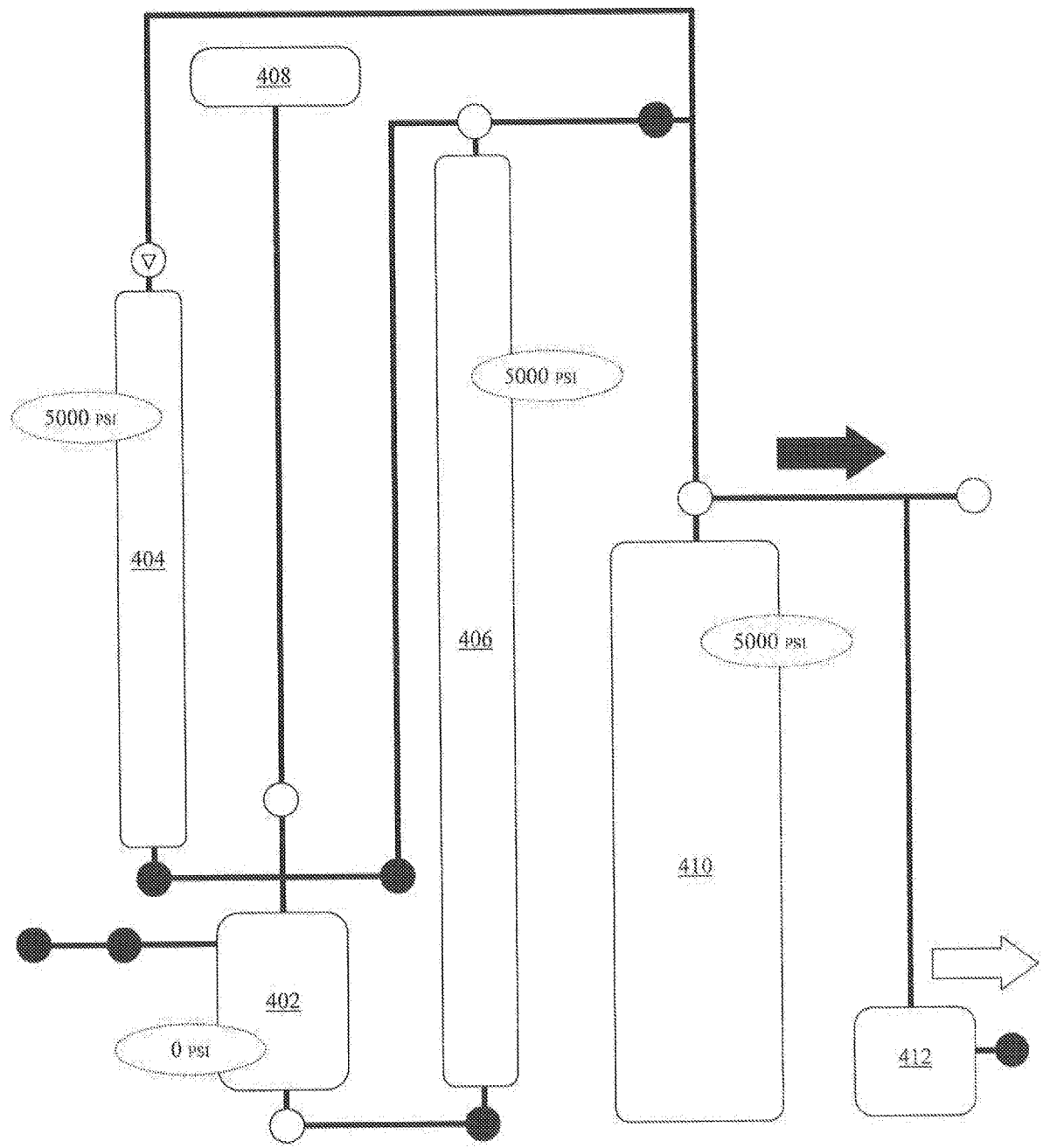
Figure 6G:
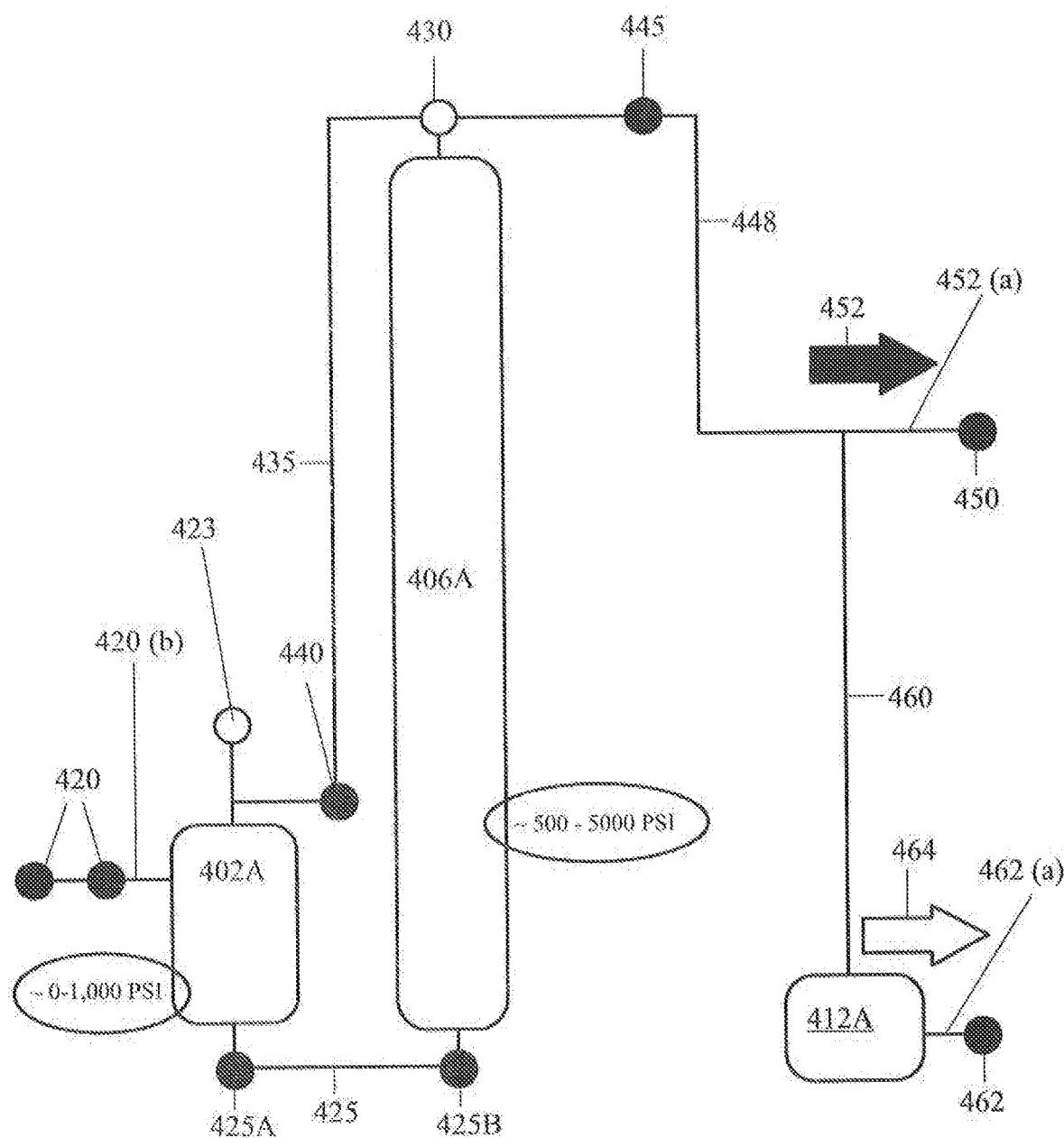

Referring specifically to FIG. 6G, the prior process of dispensing of the CNG may occur. Once again, the LNG container 402 is at 0 psi having expended all of its volume either into powering the NG powered heater 408 or primarily in converting LNG to CNG through phase change container 406 into CNG storage container 410. As shown in FIG. 6G, CNG may be dispensed directly from CNG storage container 410 or may be dispensed through an optional pressure reducer 412 to dispense low pressure natural gas. Typical pressures for the low pressure natural gas may be less than two atmospheres. The dispensing process is a two stage process. As shown, the CNG storage container 410 would dispense until pressure equalizes the tank being filled. At that point, the isolating valve between the phase change container 406 will open and the tank pressure is topped off A basic residential system and a preferred embodiment for two containers dedicated by the location of dispensing is shown in FIG. 6G(A). A pair of LNG input valves 420 are shown connected to the LNG container 402A with a work pressure of 1,000 psi along a first valved entrance pipe 420(b). When the LNG input valves 420 are opened and valve 423 and valve 425A and 440 are closed, the LNG container 402A will receive LNG therein. After receiving the LNG into the LNG receiving container, the LNG input valves 420 are closed. The LNG receiving container 402A and the LNG/CNG gasifier 406A with a work pressure of 5,000 psi then obtain an equalizing pressure, by closing valve 445 and the opening of valve 430, and 440 bringing warm CNG from 406A through valve 430 through pipe 435 and through valve 440 into 402A. When the pressure is balanced between 402A and 406A then valve 440 is closed and the LNG container 402A begins to first phase change gasify and contain the resulting high pressure gas. LNG flows out the bottom of LNG container 402A and through pipe 425 with the appropriate opening and closing of valves 425A and 425B into the approximately 240% larger LNG/CNG gasifier 406A where it warms to CNG and is fully contained. When dispensing is desired valve 430 and 445 are opened and the CNG passes from 406A into pipe 448 where it will be dispensed by a first CNG dispensing valve 450 through a first valved CNG dispensing pipe 452(a). The black arrow 452 indicates the direction of the higher pressure CNG flow to the first valved CNG dispensing valve 450. When valve 430 and 445 are opened the CNG also flows down pipe 460 and enters the pressure reducer 412A. The pressure reducer 412A steps down the pressure of the CNG to low pressure NG The NG is dispensed by a second residential NG dispensing valve 462 through a second valved residential dispensing pipe 462(a). White arrow 464 indicates the direction of lower pressure NG flow to the second valved residential NG dispensing valve 462. The residential customer may activate the CNG dispensing valve when CNG is desired and may activate the second NG dispensing valve when NG is desired. In this manner devices which run off higher pressure CNG would have an easily accessible residential fuel source, and devices which run off lower pressure NG would also have an easily accessible residential fuel source.

Figure 7:
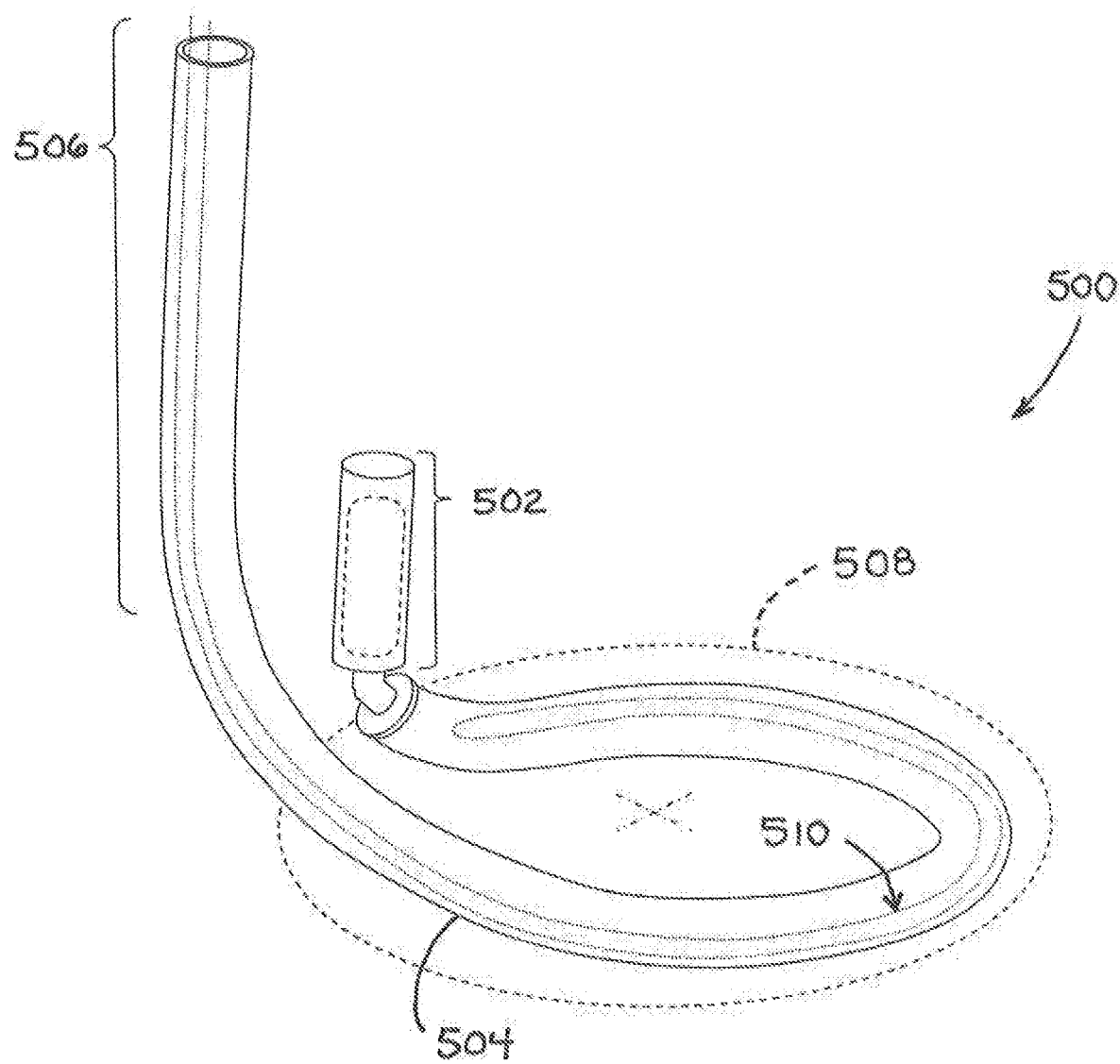
FIG. 7 is a perspective view showing elements of horizontal and vertical orientation and elevation difference to accomplish gravity flow of a preferred embodiment of the LNG receiver and the phase change container structure of the present invention showing one implementation of a number of the structures shown generally in FIGS. 6A-6G.

FIG. 7 is a perspective view showing elements of horizontal and vertical orientation and elevation difference to accomplish gravity flow of LNG of a preferred embodiment of the LNG receiver and the phase change container structure of the present invention showing one implementation of a number of the structures shown generally in FIGS. 6A-6G or 6G (A). The critical features disclosed in FIG. 7 are a part of the best current invention being the horizontal and vertical elements that make up the arrangement of the LNG container 502 and the LNG-CNG phase change container 504. The arrangement allows for the gravity feed of LNG from LNG container 502 (a Dewar container oriented vertically) into phase change container 504 (a partial Dewar container oriented horizontally). The horizontal and vertical elements make for division of liquids and gas resulting in the heavier denser liquids settling in the lower horizontal portion of the container and lighter less dense dry warm gas rising to the higher vertical portion of the phase change container. Phase change container 504 is preferably constructed of a single section of tubular wall for ease of manufacture and maintenance. Heating element 510 extends into phase change container 504 as, for example, deriving from NG powered heater 408 shown in FIGS. 6A-6G Operation of the structure of the prior system shown in FIG. 7 is essentially the same as that shown in FIGS. 6A-6G or as shown in FIG. 6G (A) with the same set of valves and flow conduits for two dedicated containers. The gravity feed structure of the embodiment shown in FIG. 7 eliminates the need to have CNG maximum pressure container 404 to push the LNG into the LNG-CNG phase change container as this is now accomplished by gravity feed. Here again, the system lends itself to implementation in smaller (lower quantities) environments such as residential homes, small industrial applications, and the like, such as micro commercial gas dispensing applications.

Figure 8A:
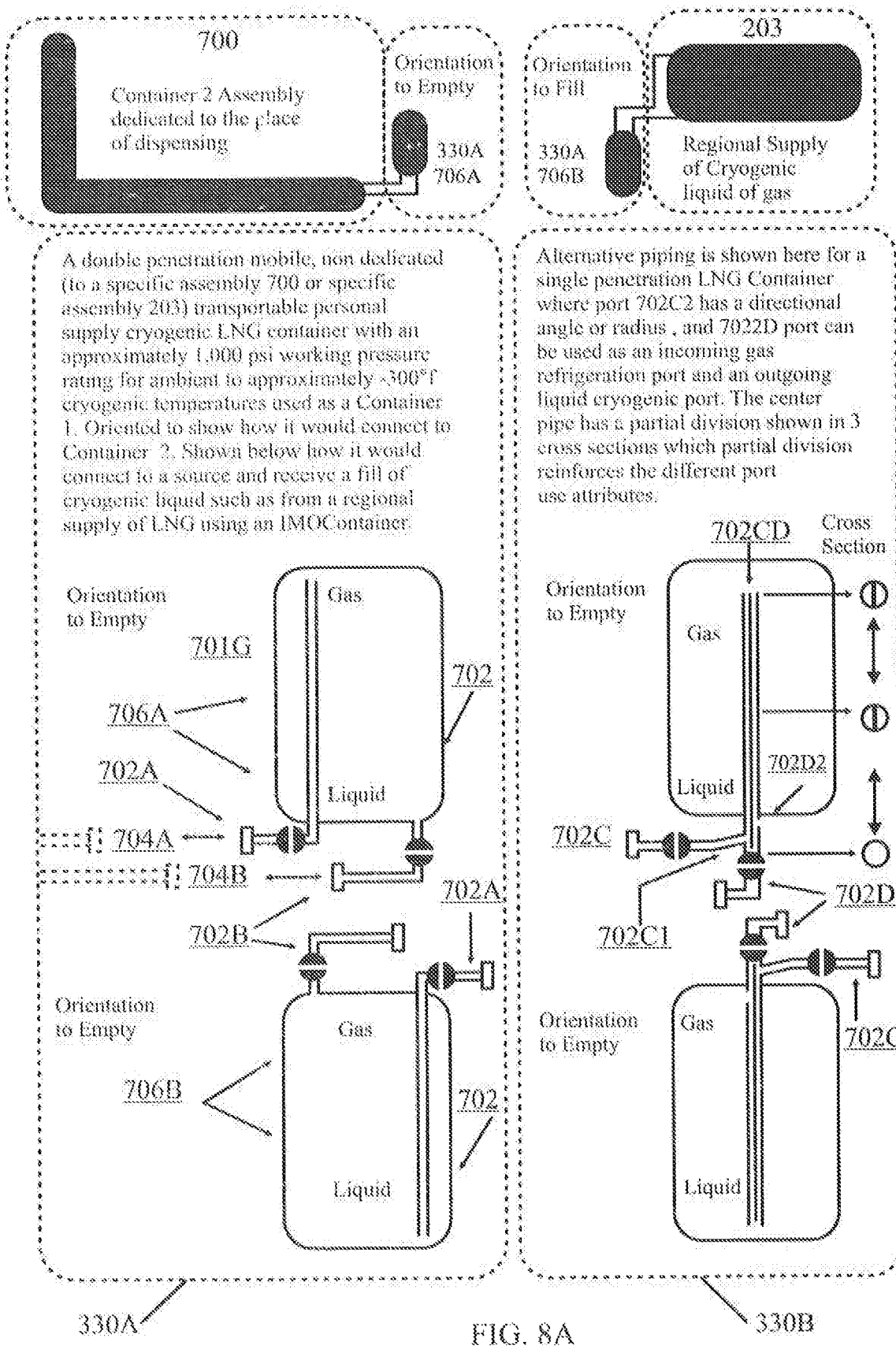
FIG. 8A shows the container structure of the two penetration non dedicated transportable personal supply cryogenic container used as the cryogenic supply container of the system of the present best invention, as well as an alternate piping single penetration version and detail on container orientation to fill and to empty and interaction between other containers in the system and process. Optionally, a single penetration non dedicated transportable personal supply cryogenic container is presented.

FIG. 8A discloses in partially schematic form the basic structure of the system of the best present invention mobile personal supply cryogenic comprised in Container 1 as a non dedicated portable mobile two penetration personal supply container and said first container 702 is comprised of a 50 gallon liquid volume and is 1,000 psi at −300F. Work pressure cryogenic vessel can be used in conjunction with a Container 2 although not dedicated to a specific Container 2. Container 2 is where primary cryogenic conversion from liquid to gas, product retention, and high pressure storage, and dispensing at the will of a human occurs. FIG. 8A shows the container structure as 330A assembly, as well as an alternate piping single penetration assembly of 330B. Different container orientations to fill and to empty are also shown at the lower portion of FIG. 8A. Container 1, element 702, is approximately 50% of the size of the Container 2 of Assembly 700 being fueled. This scale ratio is based on the goal pressure and the expansion ratio of the cryogenic molecule when it converts to gas and is fully retained to not require forced dispensing. To fill Container 1 it is positioned at the 706B orientation and connected to an IMO container 202A as shown in FIG. 5I, or some other source of cryogen supply. It can be filled from the bottom up entering cryogenic liquid through deep port, valve and pipe 702A. It can also be filled from the top down by permitting the liquid entering through the flush port valve and pipe 702B. 702A and 702B are two way ports for cryogenic liquid or for gas. In FIG. 8A valves are identified as a black filled circle with a "path". To empty Container 1 it is positioned at the 706A orientation and at an elevation above a Container 2, and temporarily connected to such as a Container 2 process Container Assembly 700 as shown on FIG. 8B and FIG. 8A in dashed lines where 702B is connected to 704B and 702A is connected to 704A. Elements 704A and 704B are two way ports for gas, and 704B is also a two way port for liquid. To transfer liquid out of Container 1 into a Container 2, a balance of pressure must be first attained between the containers opening the valve associated with 702A and 704A. Upon pressure balance the valves 702B and 704B are then opened and liquid will gravity flow into the Container 2 of Assembly 700. After this operation process Container 702 of Assembly 330A can further be used to dispense residual gas at 702A deep port or 702B flush port. Internal gas can be refrigerated to increase density or reliquify by adding cryogen of the gas to any gas in the refilling of the Container 702 initially through flush port 702B, then completing the fill through deep port 702A. Container 1 is mobile, easily transportable and not dedicated to a specific Container 2. Optionally a single penetration non dedicated transportable personal supply cryogenic container is presented as assembly 330B. The primary gas port and deep port 702C which enters the container with a directional radius and single penetration is shown at 702C1. The primary liquid single penetration flush port is also shown as number 702D, providing a flush opening of a deep port to the container empty at 702D2. The internal port is partially divided as seen in the cross sections to the right of container in FIG. 8A. 702CD cross sections represent the partial division of the deep port of the single penetration container. A single penetration container anticipates the benefit of cost and reliability over the two penetration container. However for the benefit of variable control and redundancy the present best invention uses the two penetration container, but some preference for the one penetration container for cost benefit in certain instance is present. Still referring to 8A, a double penetration, mobile, transportable, personal supply cryogenic first LNG container 330A is provided. First LNG container 330A is filled from a regional LNG supply 203. Here the first container 330A is filled with LNG until the first container has conditions of approximately 1,000 psi working pressure rating for ambient to approximately −300 degrees F. When the first container 330A is being filled with LNG at regional LNG supply 203 it is oriented as shown in FIG. 8A, element 706B. This shows the first container 330A in position to be filled by IMO Container or the like 203. The first container 330A is then taken by transport to a second LNG container 700 which is placed proximal a house, living quarters, trailer, or mobile home) where the second container 700 is interfit with connecting elements of first container 330A. Note the orientation of the first container as shown in FIG. 8A, element 706A. FIG. 8A also shows alternative piping for a single penetration LNG container which is shown at 330B.

Figure 8B:
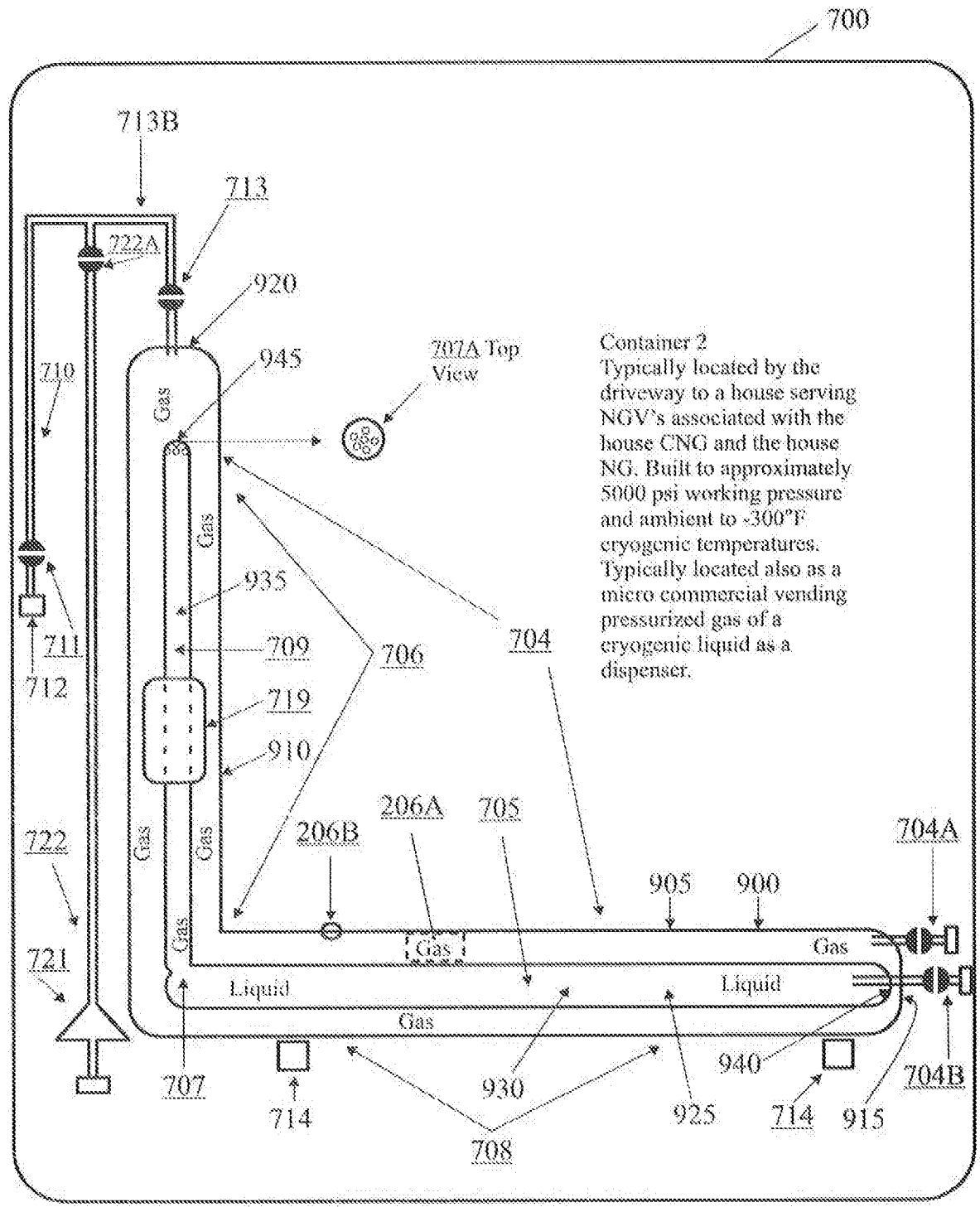
FIG. 8B shows the container structure of the dedicated converter gasifier which can retain all converted gas from a cryogen and dispense in multiple pressures, and is the container of the present best invention of the system, and dispenses only at the demand of a human operator and can be delivered, transported, assembled complete using a pickup truck and trailer, and when after placed at the location of dispensing, can receive cryogenic liquid from the container shown in 8A.

Referring specifically to FIG. 8B a partial schematic form describing the basic structure of the system of the present invention. It discloses the primary embodiment of the invention which changes the state of a cryogenic liquid to a pressurized gas and permits the dispensing of a multi pressure gas supply system. Located in box 700 is the assembly of the second container 704 and having vertical 706 and horizontal 708 elements supported by legs 714, and scaled approximately two times larger than the cryogen supply to retain all converted gas from a cryogen, and dispense in multiple pressures from the container. This ratio defines that the dedicated cryogenic converter gasifier as larger than the Cryogenic supply by 200%-240% percent for LNG to result in useful pressures of about 3,500-5,000 psi in an LNG to CNG conversion using this best invention. For small scale residential customers container 704 will have a 96 gallon liquid volume and will be capable of a 5,000 psi work pressure vessel and be rated for temperatures as low as approximately −300F. In addition to LNG methane natural gas, this best present invention and this container when scaled properly using the expansion conversion ratios of other cryogens is also capable of the conversion of Argon, Nitrogen, and Oxygen converted from their cryogenic liquid to gas form. These elements with the invention would find dispensing use in manufacturing of windows, smelting of metals, and as additives for altering flame characteristics, inflating pneumatic tires, and in the health care industry. In each cryogen of a gas listed above, the dedicated container will be larger than the supply container by at least double; the ratio difference is determined by the rate of expansion from the liquid state to the gas state of each cryogen, adjusting mathematically container ratios for the target dispensing pressure. When being installed at the dedicated location for dispensing, Assembly 700 can be transported assembled complete using a pickup truck and trailer to the desired dispensing location, and is capable of attaining a pressure balance to receive cryogenic liquid from either of the containers in FIG. 8A. The horizontal portion 708 of Container 704 has two ports 704A and 704B. Element 704B port, pipe, and valve is an in and out port for gas and an in and out port for cryogenic liquid, and is connected to the horizontal internal isolation container 705. Element 704A, port, pipe, and valve is an in and out gas port between the inside isolation container 705 and the inside of the container 704. 704A and 704B are also entrance ports for enhanced performance additives for gases of cryogenic liquids and dispense when the main product dispenses such as additives that change flame characteristics of LNG This results in the operation of the structure such that the cryogenic liquid LNG can enter through the port and pipe at 704B into the horizontal partial cryogenic containment element at 705 by gravity feed after balancing the pressure of Container 2 with a Container 1. Thereafter cryogenic liquid can be converted to a pressurized gas by the warm gas 206A thermal equalization of temperature from previous retained gasifications and heat radiated from the shell of Container 704 shown at 206B after time and absorbing ambient temperature. Heating the cryogenic liquid inside horizontal internal isolation container of 705, it expands and rises through the transition port 707 upward through the internal vertical partial isolation container of 709. Losing the liquid state, it rises through the opening into the inside of vessel at 707A to be ready to dispense. It leaves container through the vertical element at port and valve 713 and through pipe 713B and can be dispensed as gas at a point in time desired by the direction of the human dispenser operator who has a multiple choice of desired pressures including through a high pressure pipe 710 and dispensing valve 711, and CNG dispensing fixture 712 and lower pressure through valve 722A and first pipe 722 and through pressure reducing valve 721 or to choose not to dispense but to save for the future. The control and instrumentation location, including communication, is at 719, and at a corresponding communication location the Regional Supply machine to machine communication will result in a notice of the need to fill a dispenser and define the fill volume, and the dispensing location, as well as the route for Local Delivery using digital communication known in the art so is not discussed in greater detail. To recap, FIG. 8B shows Container 2 as element 704, which is transportable, and may be pre-assembled for delivery to a single residence. Once delivered to the residence Container 2 rests on elements 714 and is designed to remain at the residence and to be refilled at the residence. Container 2 704 may be considered a LNG and NG reservoir, gasifier and dispenser for a residence, which may be transported to a residence using a pickup truck, van, small truck or other small transport devices. The invention may be pulled on a flatbed trailer.

Figure 8C:
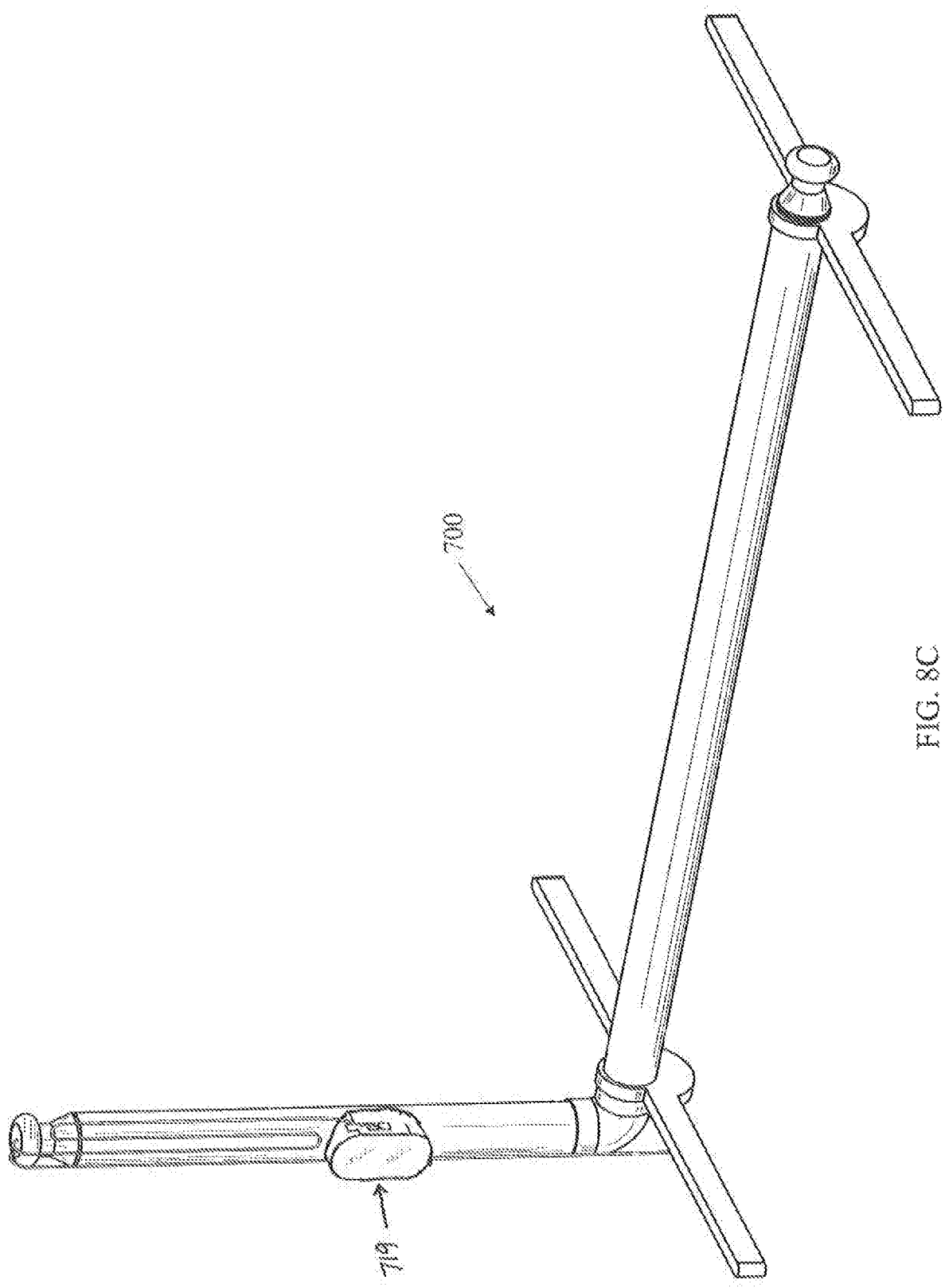
FIG. 8C shows an elevated prospective drawing of a design of the dedicated container of 8B.

FIG. 8C shows an elevated prospective drawing of one design of the dedicated container of 8B as an "L" shaped LNG receiver, converter (gasifier), gas retainer or reservoir, and dispenser capable of dispensing multiple pressures of gas, and usable in conjunction with a personal LNG supply container FIG. 8A.

Figure 8D:
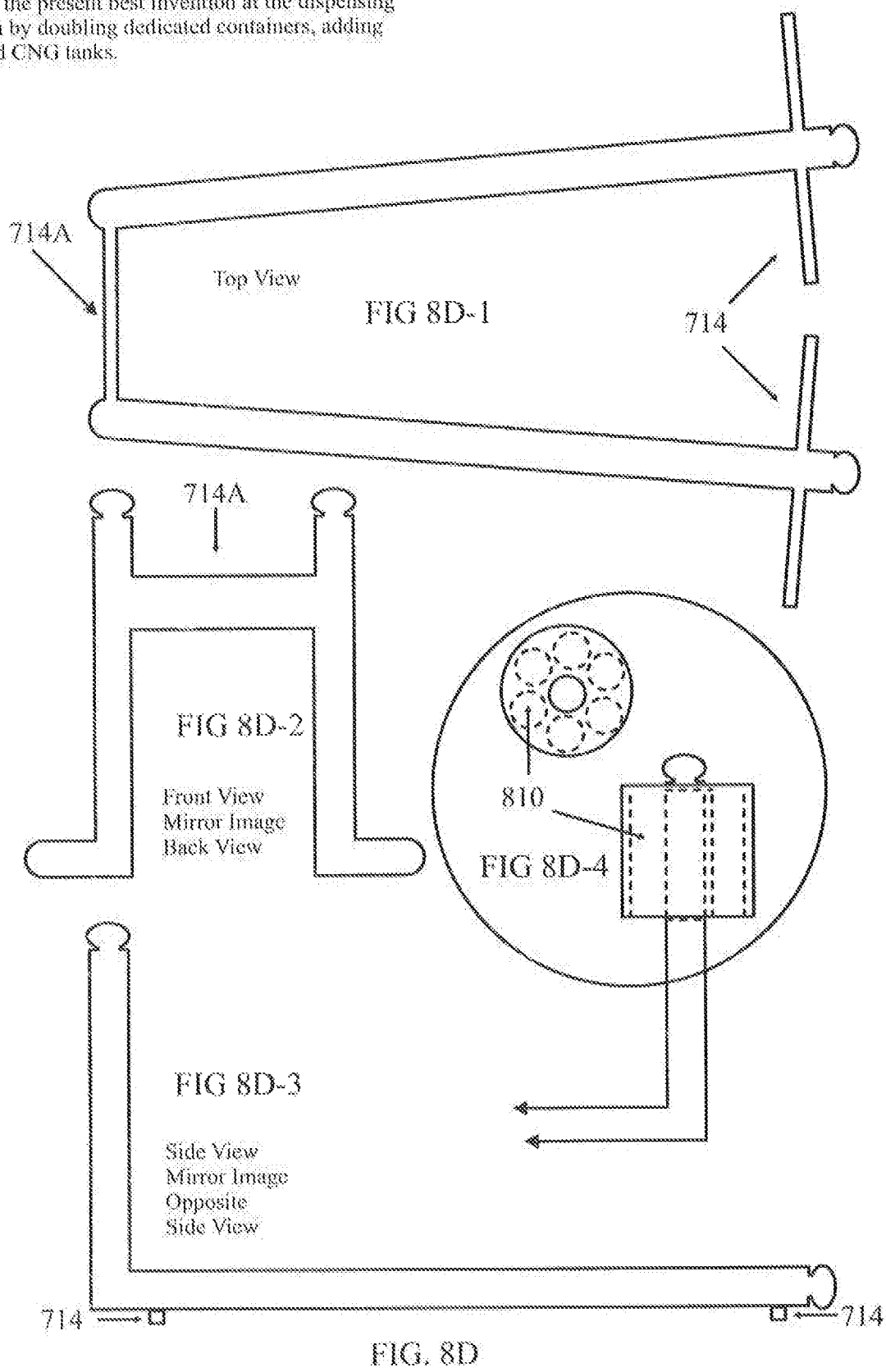
FIG. 8D shows 4 views (8D-1 to 8D-4) of the design of the dedicated container of 8B and 8C and how it would scale by doubling the size of dedicated container, and additionally by providing for elevated CNG storage tanks to scale additional CNG storage elevated for the purpose of greater security.

FIG. 8D shows scaling the best present invention showing 4 views of scaling and placement of the dedicated container of 8B and how it will scale up by doubling the volume of dedicated container by duplication. Elevated View 8D-1 shows two container assemblies joined together by a structural support with support legs 714 to scale for a larger customer. Front View 8D-2 shows two container assemblies joined together by a structural support 714A with support legs 714 to scale for a larger customer. Side View 8D-3 shows how the structure would be supported by legs 714. FIG. 8D-4 shows how scaling CNG storage can be attained in present best invention by providing an elevated location using the vertical element of the dedicated container for support of a structure holding a multiple of elevated CNG storage tanks which one is shown as 810.

Figure 8E:
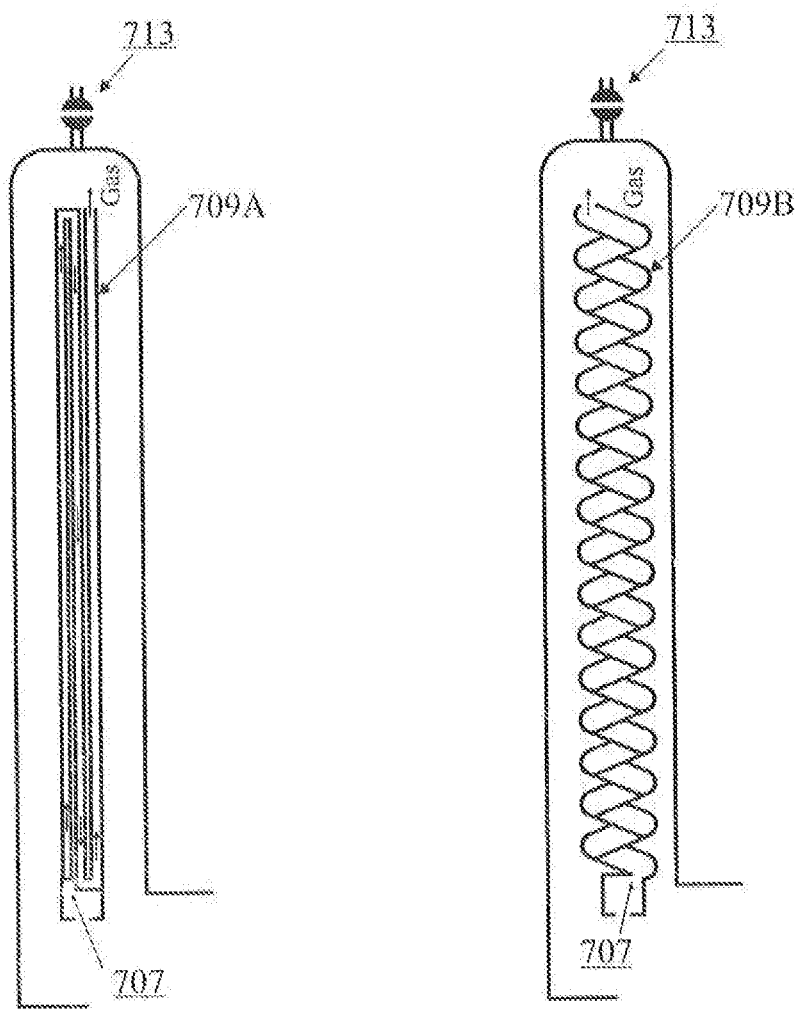
FIG. 8E shows two alternates of the internal container element 709 to be used in conjunction with container of 8B for the physical promotion of separation of liquid and gas in conversion or gasification of cryogenic liquid to gas inside the container dedicated to the point where dispensing occurs.

FIG. 8E shows two alternates of the vertical internal partial container element 709 of FIG. 8B for the physical promotion of separation of liquid and gas in conversion or gasification of cryogenic liquid to gas where it can be made to more actively separate the gas from the liquid in phase conversion using a gas density weight and differential physical force to aid separation by directing the stream of converting gasifying liquids leaving the horizontal containment through the transition port of 707 into the vertical element onto a forced path such as a circular climbing shown as 709B or such as falling and rising back and forth such as shown as 709A, either method of which physically separates gas from liquids for the benefit of product dispensing.

To recap, the invention discloses a LNG reservoir, gasifier and dispenser (700) for a single residence comprising, an external pressure vessel (900) having a first horizontal component (905) extending at substantially a right angle to a first vertical component (910), the external pressure vessel having a first hollow interior, the first horizontal component (905) including a first horizontal distal covering (915), the first vertical component including a first vertical distal covering (920), an internal partial dewars vessel (925) comprising a second horizontal component (930) extending at substantially a right angle to a second vertical component (935), the internal partial dewars vessel having a second hollow interior, the second horizontal component of the internal partial dewars vessel having a second horizontal distal covering (940), the second vertical component of the internal partial dewars vessel having a second vertical distal covering (945), the internal partial dewars vessel is nested within the first hollow interior of the external pressure vessel, a cryogenic liquid to gas transition port (707) is located at the intersection of the second horizontal component (930) and the second vertical component (935), the second vertical component (935) of the internal partial dewars vessel (925) wherein the second vertical distal covering (945) is gas permeable, a first cryogenic one way liquid port and two way gas port(704B) which passes through the first horizontal distal covering (915) the second horizontal distal covering (940) and enables the second horizontal component (930) of the internal partial dewars vessel to be filled with LNG a second two way gas port (704A) which passes through the first horizontal distal covering (915) into the first hollow interior of the external pressure vessel (900), the first vertical distal covering having a first exit port, the first exit port is selectively connected to a first pipe (722) with a low pressure through valve (LPTV) (721) to dispense low pressure gas such as NG to low pressure gas consuming devices in the residence, the first exit port is selectively connectable to a second pipe (710) to dispense higher pressure gas to devices which require higher pressure gas such as CNG consuming devices.

Additionally, the invention includes a second hollow interior of the second vertical component includes a spiral climbing tube having a tube entrance near the cryogenic liquid to gas transition port and a tube exit proximal the second vertical distal covering where the LNG is warmed by the immediate surroundings of the spiral climbing tube whereby the LNG changes physical state to CNG and the CNG exits the spiral climbing tube at the tube exit.

Also, the invention may include a second hollow interior of the second vertical component which includes a plurality of interconnected parallel and vertically oriented pipes having an entrance proximal the cryogenic liquid to gas transition port (707) and an exit proximal the second vertical distal covering (945), the interconnected parallel and vertically oriented pipes form a tortuous climbing then falling path where the LNG is warmed by the immediate surroundings of the interconnected parallel and vertically oriented pipes whereby the LNG changes physical state to CNG and the CNG exits the interconnected parallel and vertically oriented pipes at the pipe exit.

Further, the external pressure vessel rests atop a pair of support members whereby the external pressure vessel is supported in a level state.

Also, the LNG is placed into the LNG reservoir, gasifier, and dispenser by a mobile LNG supply container which includes a first two way port which is connected to the second two way gas port and a second cryogenic liquid port which is connected to the first cryogenic liquid port, whereby after equalization of the pressure between the cryogenic liquid reservoir, gasifier and dispenser and the LNG supply container with the LNG supply container at an elevation above the cryogenic liquid reservoir, gasifier and dispenser through gravity feed the cryogenic liquid reservoir, gasifier and dispenser are filled.

Further, the internal volume of the pressure vessel (900) minus the internal volume of the internal partial dewars vessel the second horizontal component (930) is approximately twice the internal volume of the internal partial dewars vessel the horizontal component (930). The invention also includes a second vertical distal covering (945) which includes a plurality of apertures (707A).

The invention may also include elements which permits the CNG to be dispensed by opening a first valve (713) and closing a second valve (722A) and opening a third valve (711), and NG is dispensed by opening the first valve (713) and closing the third valve (711) and opening the second valve (722A).

Another to describe essentially the same invention would be where a cryogenic liquid reservoir, gasifier and dispenser for dispensing a first pressure gas and a second pressure gas comprises: an external L-shaped pressure vessel with a first hollow interior, a first vertical element connected to a first horizontal element, the first horizontal element including a first horizontal distal covering, the first vertical element including a first vertical distal covering, an internal L-shaped partial dewars vessel with a second hollow interior, a second vertical element connected to a second horizontal element, a transitional port located at the intersection of the second horizontal element and the second vertical element, the transitional port allows the gas converted from the change of state of the cryogenic liquid into a gas in the internal L-shaped partial dewars vessel the second horizontal element to pass to the internal L-shaped dewars vessel the second vertical element, the second horizontal element having a second horizontal distal covering, the internal L-shaped partial dewars vessel nested within the external L-shaped pressure vessel the first hollow interior, the second vertical element having a first distal vertical gas permeable covering, a one way cryogenic liquid and two way gas port (704B) which passes through the first horizontal distal covering and the second horizontal distal covering, which permits a cryogenic liquid to fill the internal L-shaped partial dewars vessel the second horizontal element, a second two way gas port (704A) which allows two way gas flow to pass through the first horizontal distal covering, the first vertical distal covering having a first exit port, the first exit port selectively connected to a first pipe (722) with a low pressure through valve (LPTV) (721) to dispense the first pressure gas, the first exit port further selectively connectable to a second pipe (710) to dispense the second pressure gas. Also, the second pressure gas has a higher pressure then the first pressure gas. Additionally, the cryogenic liquid is selected from the group consisting of liquid Natural Gas (LNG), liquid Nitrogen, liquid Argon, and liquid Oxygen. In one version of this invention, the cryogenic liquid is LNG Further, the second hollow interior of the second vertical element includes a spiral climbing tube having a tube entrance near the transitional port and a tube exit proximal the second vertical distal covering where the LNG is warmed by the immediate surroundings of the spiral climbing tube whereby the LNG changes physical state to CNG and the CNG exits the spiral climbing tube at the tube exit.

In a further instance, the second hollow interior of the second vertical element may include a plurality of interconnected parallel and vertically oriented pipes having a pipe entrance proximal the transitional port (707) and a pipe exit proximal the second vertical distal covering (945), the interconnected parallel and vertically oriented pipes form a tortuous path where the LNG is warmed by the immediate surroundings of the interconnected parallel and vertically oriented pipes whereby the LNG changes physical state to CNG and the CNG exits the interconnected parallel and vertically oriented pipes at the pipe exit.

Also, the internal volume of the pressure vessel (900) minus the internal volume of the internal partial dewars vessel the second horizontal element (930) is approximately twice the internal volume of the internal partial dewars vessel the horizontal element (930).

In this invention the CNG is dispensed by opening a first valve (713) and closing a second valve (722A) and opening a third valve (711), and the NG is dispensed by opening the first valve (713) and closing the third valve (711) and opening the second valve (722A). Also, all gas converted from the gasification of the cryogenic liquid is stored in the external L-shaped pressure vessel.

This invention includes a mechanism where the first pipe (722) with the low pressure through valve (LPTV) (721) has an exit which is attached to the NG pipe system located in a domicile, and the second pipe has an exit for CNG where the NG and the CNG may be dispensed simultaneously by opening the first valve (713), the second valve (722A) and the third valve (711). This means that both CNG and NG may be simultaneously dispensed if desired; however, either the CNG or NG may be dispensed singly.

Although the present invention has been described in conjunction with a number of embodiments, those skilled in the art will recognize modifications to these embodiments that still fall within the scope of the present invention. Alternately, the present invention may be implemented in conjunction with electrolysis at depth and/or pressure. Alternate embodiments in conjunction with differently sized systems are also anticipated.

I claim:

1. A LNG reservoir, gasifier and dispenser (700) comprising,
an external pressure vessel (900) having a first horizontal component (905) extending at a right angle to a first vertical component (910), said external pressure vessel having a first hollow interior, said first horizontal component (905) including a first horizontal distal covering (915), said first vertical component including a first vertical distal covering (920),
an internal partial Dewar vessel (925) comprising a second horizontal component (930) extending at a right angle to a second vertical component (935), said internal partial Dewar vessel having a second hollow interior, said second horizontal component of said internal partial Dewar vessel having a second horizontal distal covering (940), said second vertical component of said internal partial Dewar vessel having a second vertical distal covering (945),
said internal partial Dewar vessel is nested within said first hollow interior of said external pressure vessel,
a cryogenic liquid to gas transition port (707) is located at the intersection of said second horizontal component (930) and said second vertical component (935),
said second vertical component (935) of said internal partial Dewar vessel (925) wherein said second vertical distal covering (945) is gas permeable,
a first cryogenic one way liquid port and two way gas port(704B) which passes through said first horizontal distal covering (915) said second horizontal distal covering (940) and enables said second horizontal component (930) of said internal partial Dewar vessel to be filled with LNG,
a second two way gas port (704A) which passes through said first horizontal distal covering (915) into said first hollow interior of said external pressure vessel (900),
said first vertical distal covering having a first exit port, said first exit port is selectively connected to a first pipe (722) with a low pressure through valve (LPTV) (721) to dispense low pressure gas,
said first exit port is selectively connectable to a second pipe (710) to dispense higher pressure gas to devices which require higher pressure gas.

2. A The LNG reservoir, gasifier and dispenser as claimed in claim 1 wherein said second hollow interior of said second vertical component includes a spiral climbing tube having a tube entrance near said cryogenic liquid to gas transition port and a tube exit proximal said second vertical distal covering, where the LNG is warmed by said spiral climbing tube whereby the LNG changes physical state to CNG, and the CNG exits said spiral climbing tube at said tube exit.

3. The LNG reservoir, gasifier and dispenser as claimed in claim 1 wherein said second hollow interior of said second vertical component includes a plurality of interconnected parallel and vertically oriented pipes having an entrance proximal said cryogenic liquid to gas transition port (707) and a pipe exit proximal said second vertical distal covering (945), said interconnected parallel and vertically oriented pipes form a tortuous climbing then falling path where the LNG is warmed by said interconnected parallel and vertically oriented pipes whereby the LNG changes physical state to CNG, and the CNG exits said interconnected parallel and vertically oriented pipes at said pipe exit.

4. The LNG reservoir, gasifier and dispenser as claimed in claim 2 wherein said external pressure vessel rests atop a pair of support members whereby said external pressure vessel is supported in a level state.

5. The LNG reservoir, gasifier and dispenser as claimed in claim 3 wherein said external pressure vessel rests atop a pair of support members whereby said external pressure vessel is supported in a level state.

6. The LNG reservoir, gasifier and dispenser as claimed in claim 1 wherein the LNG is placed into said LNG reservoir, gasifier, and dispenser by a mobile LNG supply container which includes a first two way port which is connected to said second two way gas port and a second cryogenic liquid port which is connected to said first cryogenic liquid port, whereby after equalization of the pressure between the cryogenic liquid reservoir, gasifier and dispenser and the LNG supply container with the LNG supply container at an elevation above the cryogenic liquid reservoir, gasifier and dispenser through gravity feed said cryogenic liquid reservoir, gasifier and dispenser are filled.

7. The LNG reservoir, gasifier and dispenser as claimed in claim 1 wherein the internal volume of the pressure vessel (900) minus the internal volume of said internal partial Dewar vessel said second horizontal component (930) is approximately twice the internal volume of said internal partial Dewar vessel said horizontal component (930).

8. The LNG reservoir, gasifier and dispenser as claimed in claim 1 wherein said second vertical distal covering (945) includes a plurality of apertures (707A).

9. The LNG reservoir, gasifier and dispenser as claimed in claim 1 wherein CNG is dispensed by opening a first valve (713) and closing a second valve (722A) and opening a third valve (711), and NG is dispensed by opening said first valve (713) and closing said third valve (711) and opening said second valve (722A).

10. A cryogenic liquid reservoir, gasifier and dispenser for dispensing a first pressure gas and a second pressure gas comprising:
an external L-shaped pressure vessel with a first hollow interior,
a first vertical element connected to a first horizontal element,
said first horizontal element including a first horizontal distal covering,
said first vertical element including a first vertical distal covering,
an internal L-shaped partial Dewar vessel with a second hollow interior,
a second vertical element connected to a second horizontal element,
a transitional port located at an intersection of said second horizontal element and said second vertical element,
said second horizontal element having a second horizontal distal covering,
said internal L-shaped partial Dewar vessel nested within said external L-shaped pressure vessel said first hollow interior,
said second vertical element having a first distal vertical gas permeable covering,
a one way cryogenic liquid and two way gas port (704B) which passes through said first horizontal distal covering and said second horizontal distal covering, which permits a cryogenic liquid to fill said internal L-shaped partial Dewar vessel said second horizontal element, a second two way gas port (704A) which allows two way gas flow to pass through said first horizontal distal covering, said first vertical distal covering having a first exit port, said first exit port selectively connected to a first pipe (722) with a low pressure through valve (LPTV) (721) to dispense said first pressure gas, said first exit port further selectively connectable to a second pipe (710) to dispense said second pressure gas.

11. The cryogenic liquid reservoir, gasifier and dispenser for dispensing a first pressure gas and a second pressure gas as claimed in claim 10 wherein said second pressure gas has a higher pressure then said first pressure gas.

12. The cryogenic liquid reservoir, gasifier and dispenser for dispensing a first pressure gas and a second pressure gas as claimed in claim 10 whereby said cryogenic liquid is selected from the group consisting of liquid Natural Gas (LNG), liquid Nitrogen, liquid Argon, and liquid Oxygen.

13. The cryogenic liquid reservoir, gasifier and dispenser for dispensing a first pressure gas and a second pressure gas as claimed in claim 10 wherein said cryogenic liquid is LNG.

14. The cryogenic liquid reservoir, gasifier and dispenser for dispensing a first pressure gas and a second pressure gas as claimed in claim 13 wherein said second hollow interior of said second vertical element includes a spiral climbing tube having a tube entrance near said transitional port and a tube exit proximal said second vertical distal covering.

15. The cryogenic liquid reservoir, gasifier and dispenser for dispensing a first pressure gas and a second pressure gas as claimed in claim 13 wherein said second hollow interior of said second vertical element includes a plurality of interconnected parallel and vertically oriented pipes having a pipe entrance proximal said transitional port (707) and a pipe exit proximal said second vertical distal covering (945), said interconnected parallel and vertically oriented pipes form a tortuous path where the LNG is warmed by the immediate surroundings of said interconnected parallel and vertically oriented pipes whereby the LNG changes physical state to CNG, and the CNG exits said interconnected parallel and vertically oriented pipes at said pipe exit.

16. The cryogenic liquid reservoir, gasifier and dispenser for dispensing a first pressure gas and a second pressure gas as claimed in claim 10 where the internal volume of the pressure vessel (900) minus the internal volume of said internal partial Dewar vessel said second horizontal element (930) is approximately twice the internal volume of said internal partial Dewar vessel said horizontal element (930).

17. The cryogenic liquid reservoir, gasifier and dispenser for dispensing a first pressure gas and a second pressure gas as claimed in claim 13 wherein CNG is dispensed by opening a first valve (713) and closing a second valve (722A) and opening a third valve (711), and NG is dispensed by opening said first valve (713) and closing said third valve (711) and opening said second valve (722A).

18. The cryogenic liquid reservoir, gasifier and dispenser for dispensing a first pressure gas and a second pressure gas as claimed in claim 10 whereby all gas is stored in said external L-shaped pressure vessel.

19. The cryogenic liquid reservoir, gasifier and dispenser for dispensing a first pressure gas and a second pressure gas as claimed in claim 17 wherein said first pipe (722) said low pressure through valve (LPTV) (721) has an exit which is attached to the NG pipe system, and said second pipe has an exit for CNG, where the NG and the CNG may be dispensed simultaneously by opening said first valve (713), said second valve (722A) and said third valve (711).

* * * * *